(12) United States Patent
Yushin et al.

(10) Patent No.: US 11,502,332 B2
(45) Date of Patent: Nov. 15, 2022

(54) BATTERY CELL INCLUDING AN INORGANIC, MELT-INFILTRATED, SOLID-STATE ELECTROLYTE

(71) Applicant: Sila Nanotechnologies Inc., Alameda, CA (US)

(72) Inventors: Gleb Yushin, Atlanta, GA (US); Yiran Xiao, Atlanta, GA (US); Kostiantyn Turcheniuk, Oakland, CA (US)

(73) Assignees: GEORGIA TECH RESEARCH CORPORATION, Atlanta, GA (US); SILA NANOTECHNOLOGIES, INC., Alameda, CA (US)

( * ) Notice: Subject to any disclaimer, the term of this patent is extended or adjusted under 35 U.S.C. 154(b) by 70 days.

(21) Appl. No.: 17/121,440

(22) Filed: Dec. 14, 2020

(65) Prior Publication Data
US 2021/0184250 A1 Jun. 17, 2021

Related U.S. Application Data

(60) Provisional application No. 62/947,495, filed on Dec. 12, 2019.

(51) Int. Cl.
*H01M 10/0562* (2010.01)
*H01M 4/04* (2006.01)
(Continued)

(52) U.S. Cl.
CPC ..... *H01M 10/0562* (2013.01); *H01M 4/0428* (2013.01); *H01M 4/505* (2013.01);
(Continued)

(58) Field of Classification Search
CPC .... H01M 4/0428; H01M 4/505; H01M 4/525; H01M 4/623; H01M 4/625;
(Continued)

(56) References Cited

U.S. PATENT DOCUMENTS

2017/0170515 A1* 6/2017 Yushin ............... H01M 50/434
2020/0067128 A1* 2/2020 Chmiola ................. H01M 4/36
(Continued)

FOREIGN PATENT DOCUMENTS

WO WO-2017204859 A1 * 11/2017 ........ H01M 10/0436
WO WO-2020041767 A1 * 2/2020 .......... H01M 10/052

*Primary Examiner* — Matthew J Merkling
(74) *Attorney, Agent, or Firm* — Muncy, Geissler, Olds & Lowe, P.C.; Daniel Podhajny

(57) ABSTRACT

In an aspect, a solid-state Li-ion battery (SSLB) cell, may comprise an anode electrode comprising an anode electrode surface and an anode active material, a cathode electrode comprising a cathode electrode surface and an cathode active material, and an inorganic, melt-infiltrated, solid state electrolyte (SSE) ionically coupling the anode electrode and the cathode electrode, wherein at least a portion of at least one of the electrode surfaces comprises an interphase layer separating the respective electrode active material from direct contact with the SSE, and wherein the interphase layer comprises two or more metals from the list of: Zr, Al, K, Cs, Fr, Be, Mg, Ca, Sr, Ba, Sc, Y, La or non-La lanthanoids, Ta, Zr, Hf, and Nb.

20 Claims, 17 Drawing Sheets
(3 of 17 Drawing Sheet(s) Filed in Color)

ASSLB BY MELT-INFILTRATION

- ✓ DENSELY PACKED ELECTRODES
- ✓ THIN SSE LAYER
- ✓ HIGHER ENERGY DENSITY
- ✓ LOWER CELL FABRICATION COST
- ✓ FABRICATION COMPATIBLE WITH INDUSTRIAL PROCESSING OF COMMERCIAL Li-ion CELLS

(51) Int. Cl.
  *H01M 4/62* (2006.01)
  *H01M 4/525* (2010.01)
  *H01M 10/0525* (2010.01)
  *H01M 4/505* (2010.01)
  *H01M 4/02* (2006.01)

(52) U.S. Cl.
  CPC ........... *H01M 4/525* (2013.01); *H01M 4/623* (2013.01); *H01M 4/625* (2013.01); *H01M 10/0525* (2013.01); *H01M 2004/027* (2013.01); *H01M 2004/028* (2013.01); *H01M 2300/008* (2013.01)

(58) Field of Classification Search
  CPC ......... H01M 10/0562; H01M 10/0525; H01M 2004/027; H01M 2004/028; H01M 2300/008
  See application file for complete search history.

(56) References Cited

U.S. PATENT DOCUMENTS

| | | | |
|---|---|---|---|
| 2020/0083542 A1* | 3/2020 | Yushin | H01M 4/8828 |
| 2020/0091517 A1* | 3/2020 | Yushin | H01G 11/44 |
| 2020/0235420 A1* | 7/2020 | Yushin | H01M 10/0525 |
| 2020/0343580 A1* | 10/2020 | Yushin | H01M 10/44 |
| 2020/0403267 A1* | 12/2020 | Li | H01M 4/131 |
| 2021/0184250 A1* | 6/2021 | Yushin | H01M 4/505 |
| 2021/0384551 A1* | 12/2021 | Kondo | H01M 10/052 |
| 2022/0131125 A1* | 4/2022 | Yushin | C23C 16/30 |

\* cited by examiner

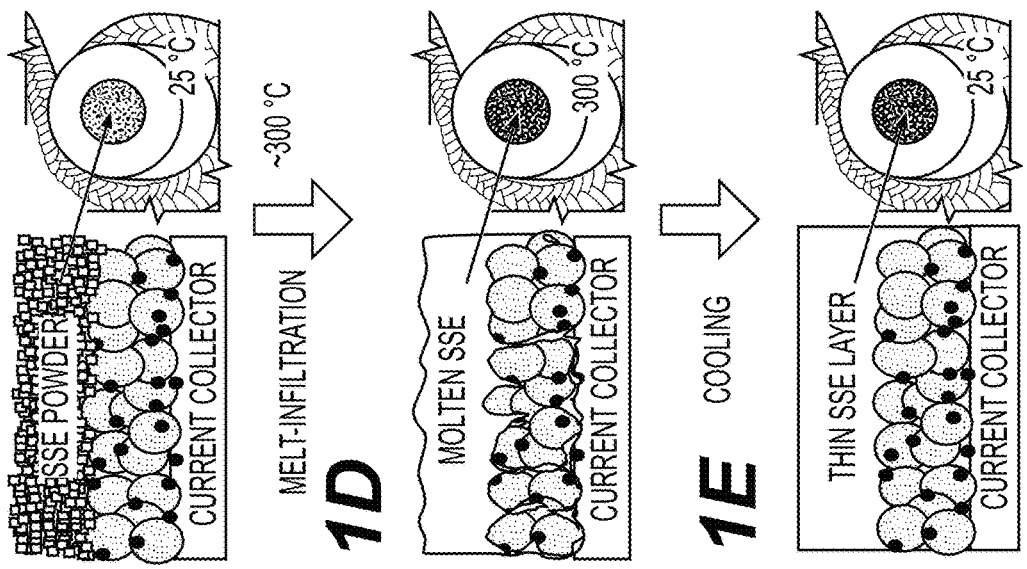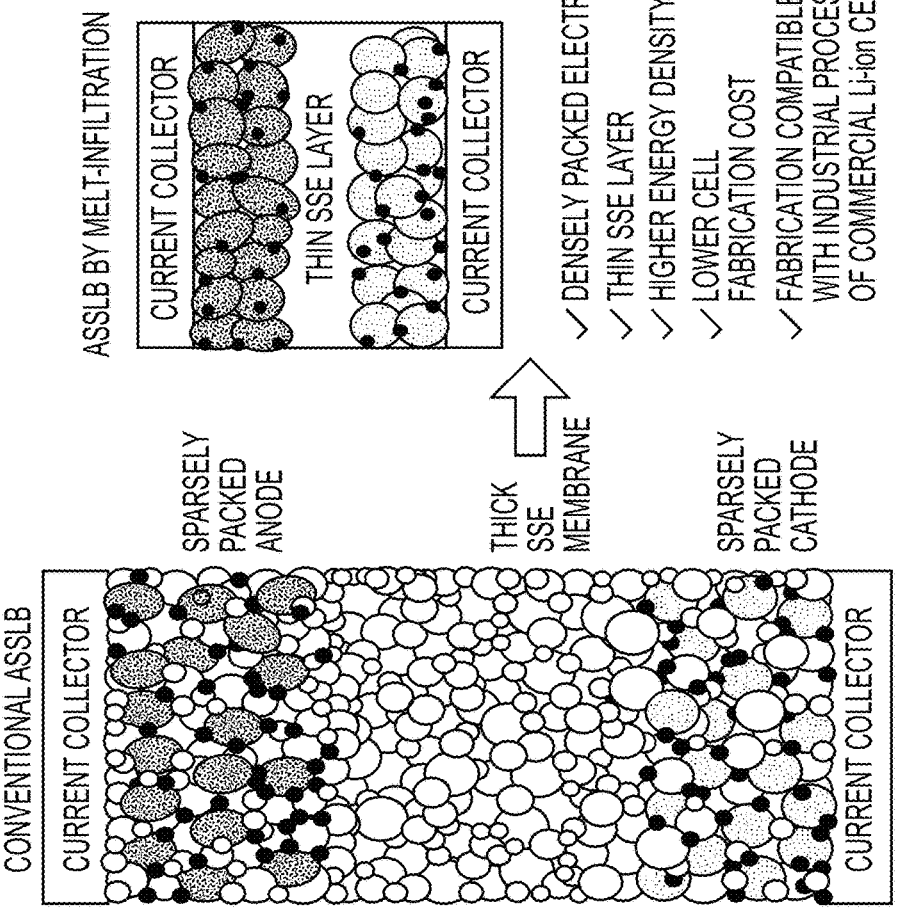

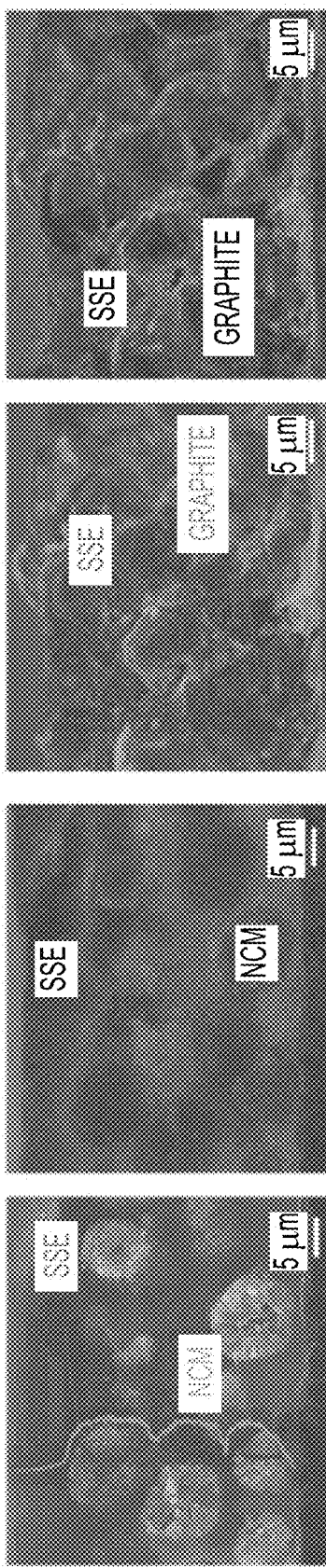
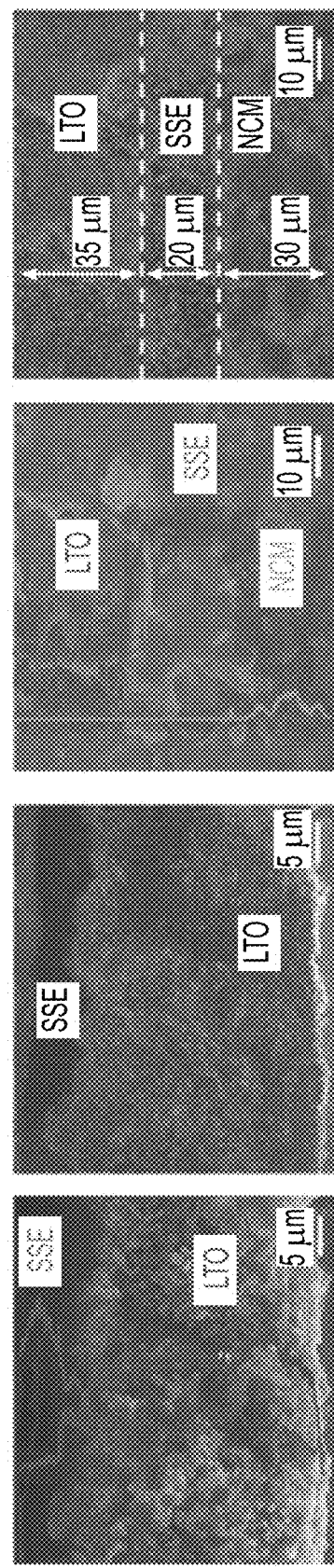
FIG. 3A  FIG. 3B  FIG. 3C  FIG. 3D
FIG. 3E  FIG. 3F  FIG. 3G  FIG. 3H

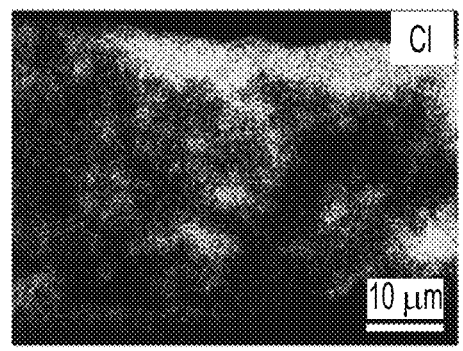 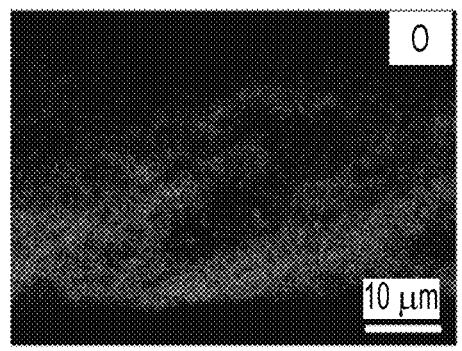
FIG. 5A  FIG. 5B
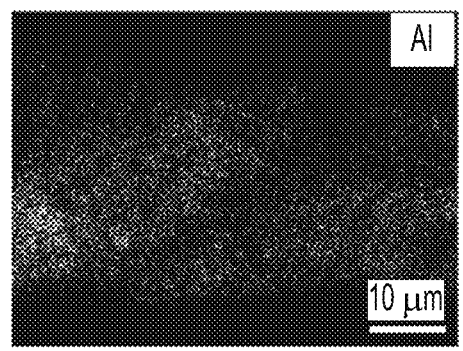 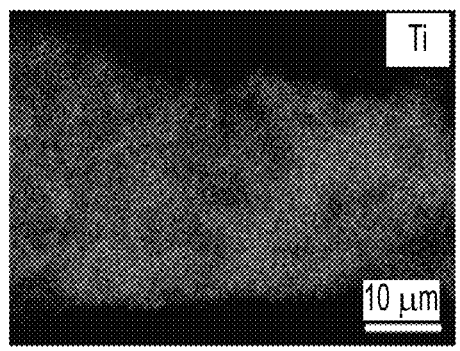
FIG. 5D  FIG. 5C
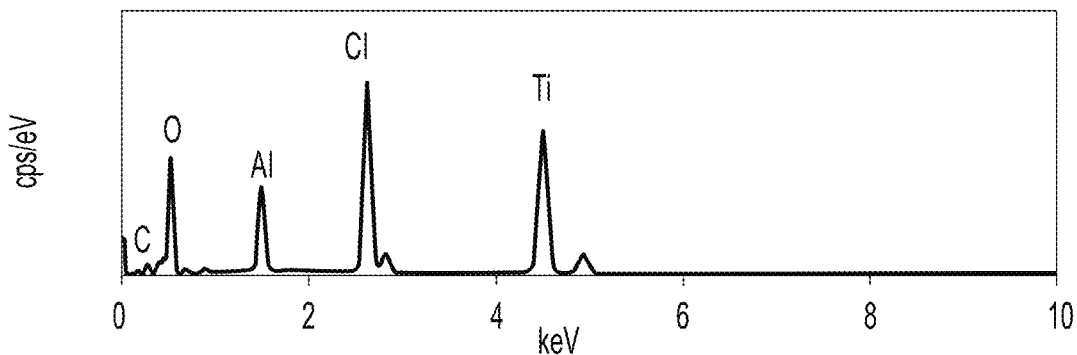
FIG. 5E

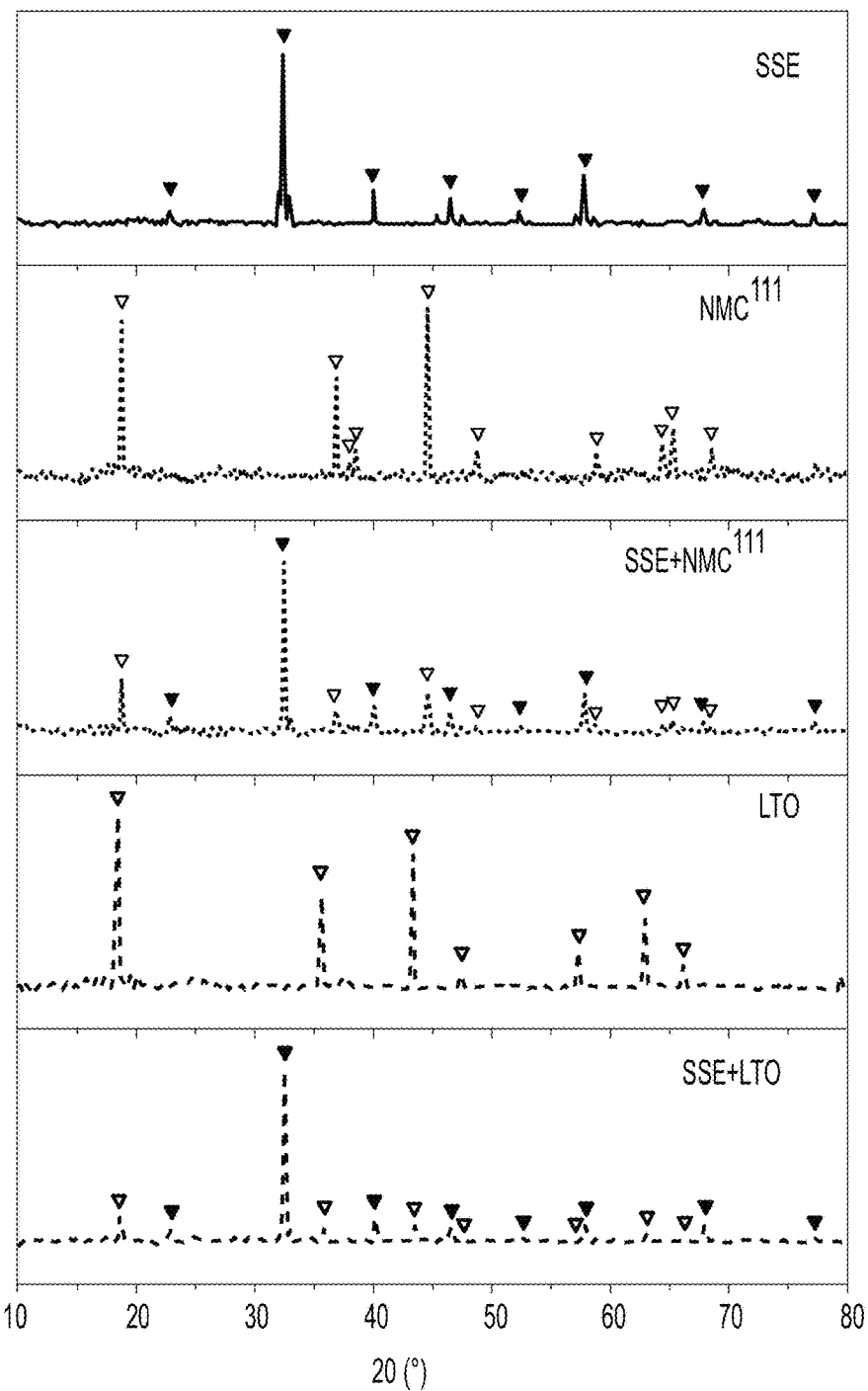

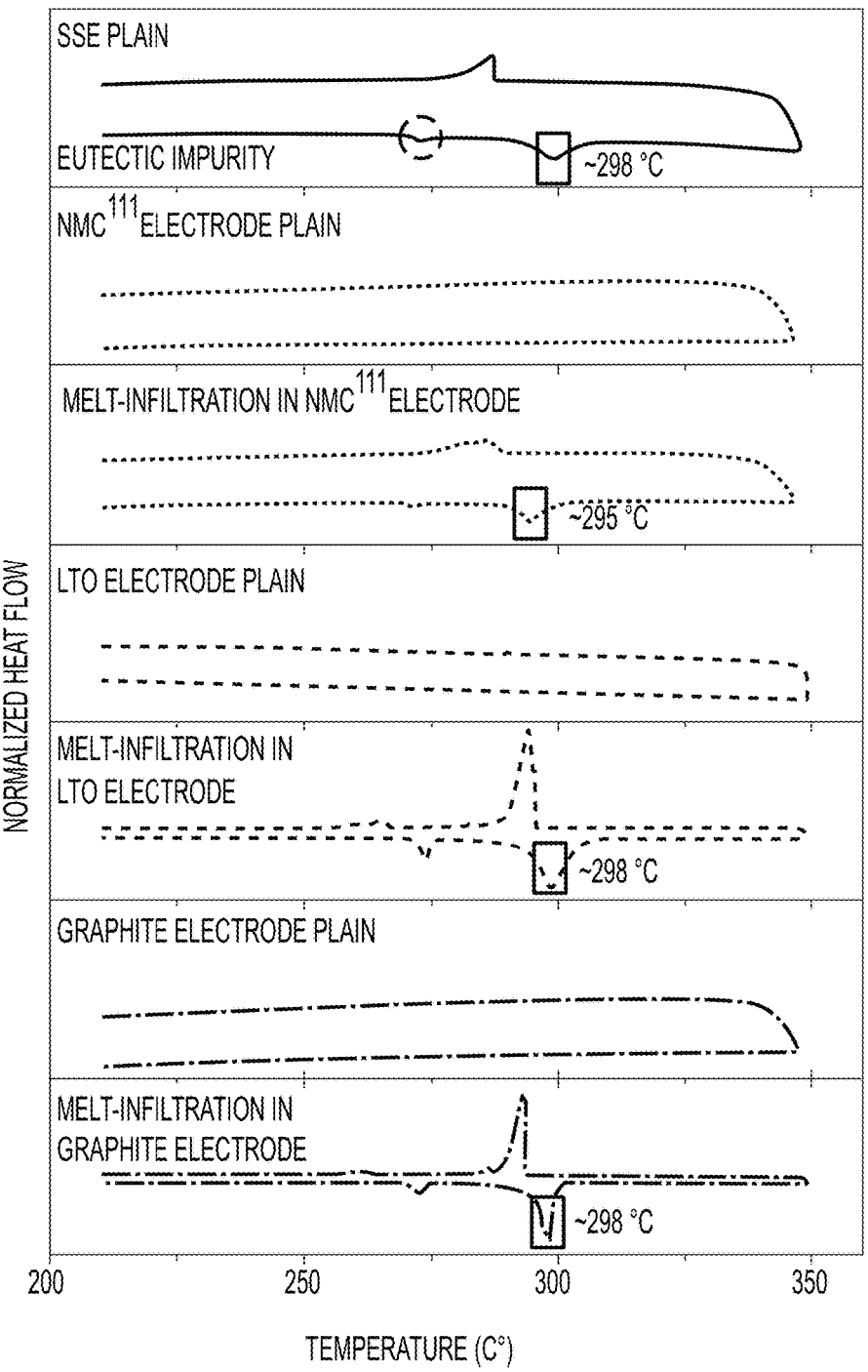

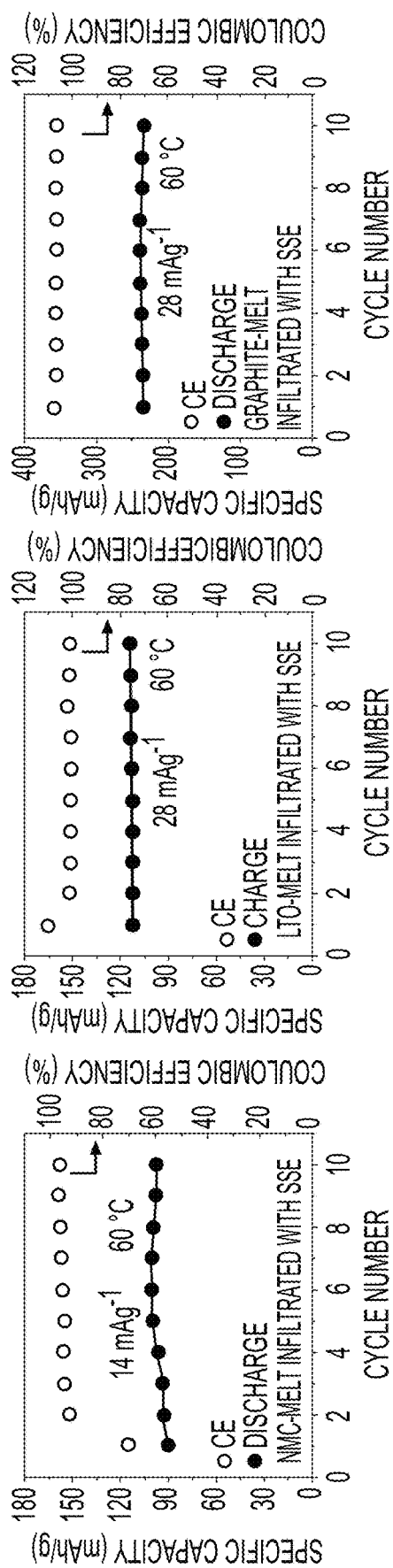
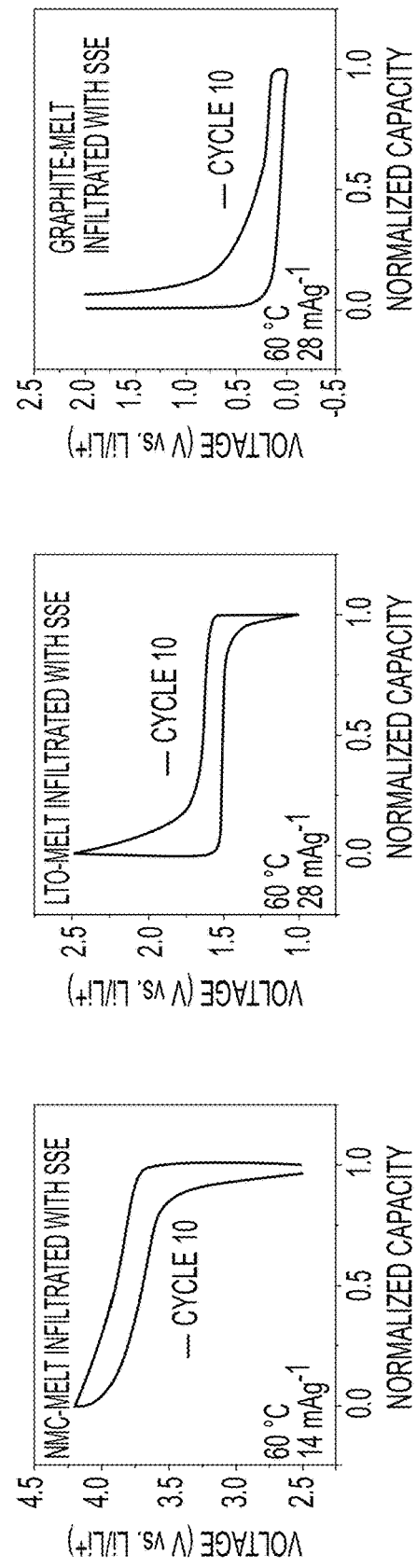
FIG. 9A  FIG. 9B  FIG. 9C  FIG. 9D  FIG. 9E  FIG. 9F

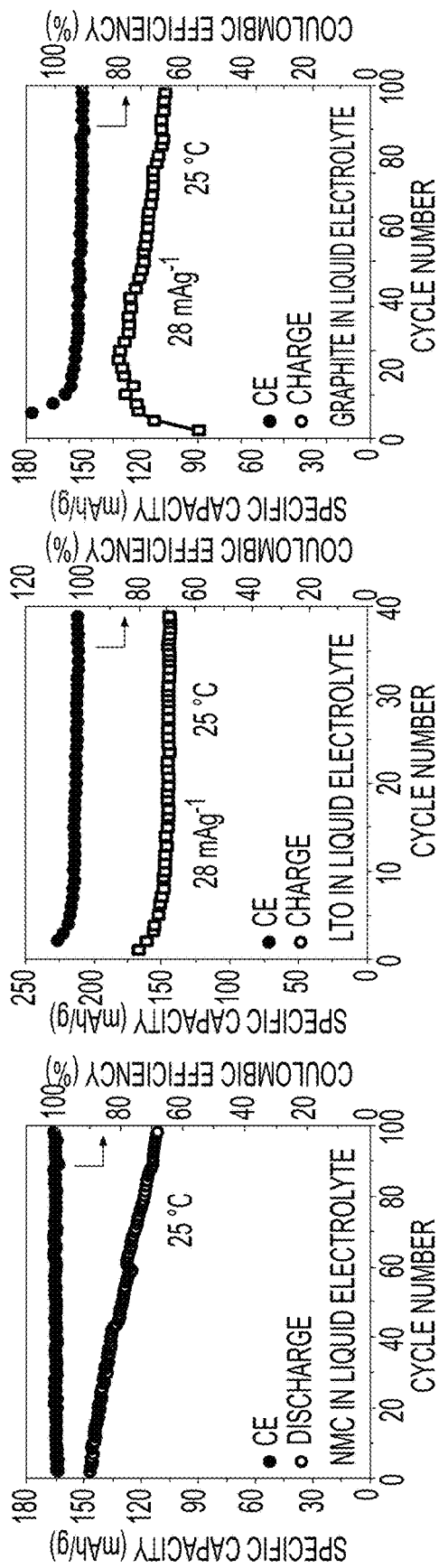
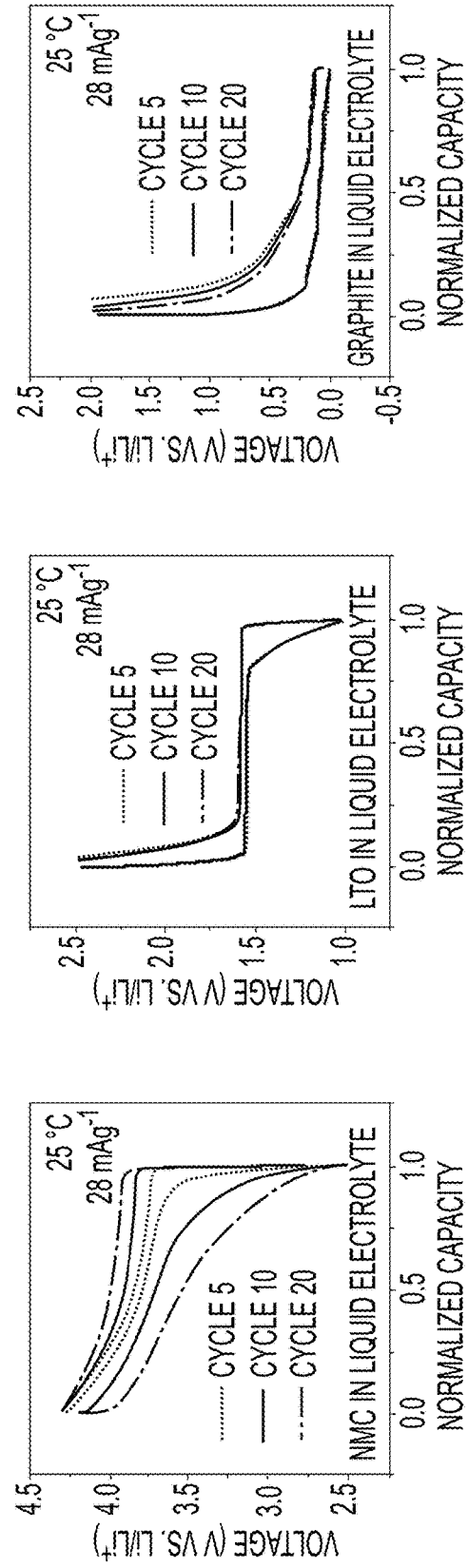
FIG. 10A  FIG. 10B  FIG. 10C  FIG. 10D  FIG. 10E  FIG. 10F

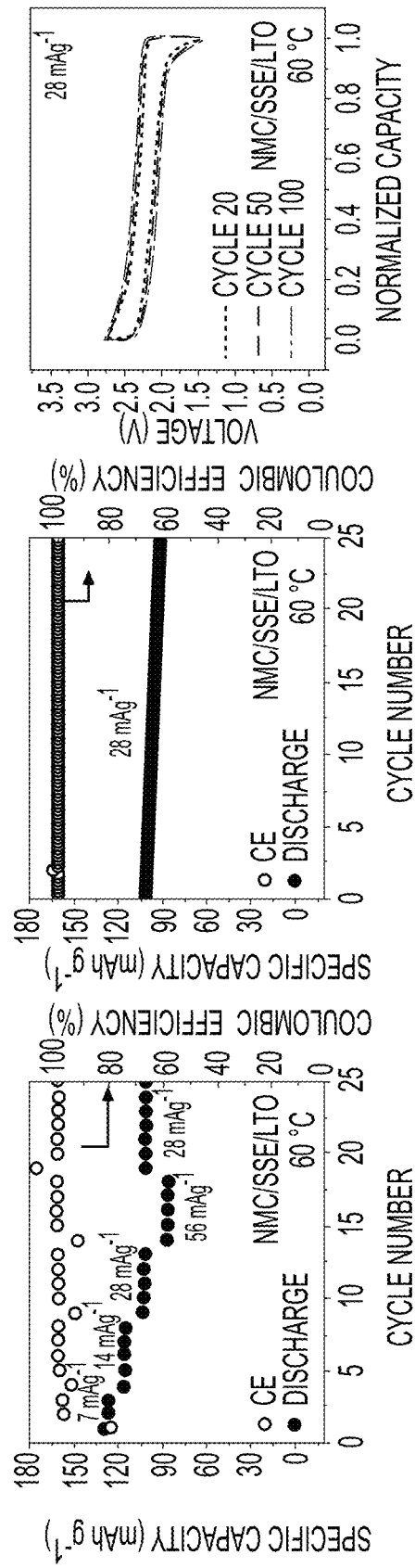

BATTERY CELL INCLUDING AN INORGANIC, MELT-INFILTRATED, SOLID-STATE ELECTROLYTE

CROSS-REFERENCE TO RELATED APPLICATIONS

The present application for patent claims the benefit of U.S. Provisional Application No. 62/947,495, entitled "BATTERY CELL INCLUDING AN INORGANIC, MELT-INFILTRATED, SOLID-STATE ELECTROLYTE," filed Dec. 12, 2019, which is expressly incorporated herein by reference in its entirety.

BACKGROUND

Field

Aspects of the present disclosure relates generally to energy storage devices, and more particularly to metal and metal-ion battery technology and the like.

Background

Owing in part to their relatively high energy densities, relatively high specific energy, light weight, and potential for long lifetimes, advanced rechargeable metal batteries, and rechargeable metal and metal-ion batteries, such as lithium metal (Li) and lithium-ion (Li-ion) batteries, are desirable for a wide range of consumer electronics, electric vehicle, grid storage and other important applications. Similarly, primary (largely not rechargeable) metal and metal-ion batteries, such as primary Li batteries, are desired for a range of applications, where high energy density and/or high specific energy of batteries is needed, even if the batteries may be disposed of after a single use.

However, despite the increasing commercial prevalence of Li-ion batteries and some of the Li primary batteries, further development of these batteries is needed, particularly for potential applications in low- or zero-emission, hybrid-electrical or fully-electrical vehicles, consumer electronics, energy-efficient cargo ships and locomotives, aerospace applications, and power grids.

One desired feature of metal and metal-ion batteries for some applications is enhanced safety. It is desirable that batteries do not induce fire, even under extreme cases such as a nail penetration test. Solid electrolytes may, in principle, provide such enhanced safety. Unfortunately, the practical applications of solid-state batteries with solid electrolytes are often limited by lower energy density, lower power density (particularly at low temperatures), and higher costs.

Another desired feature of metal and metal-ion batteries is enhanced energy density. Furthermore, it is typically desirable for higher energy density to not lead to a substantial reduction in cycle stability of the cell or a reduction in rate performance, which is very challenging to achieve.

Accordingly, there remains a need for improved metal and metal-ion batteries, components, and other related materials and manufacturing processes.

SUMMARY

In an aspect, a solid-state Li-ion battery (SSLB) cell includes: an anode electrode comprising an anode electrode surface and an anode active material; a cathode electrode comprising a cathode electrode surface and an cathode active material; and an inorganic, melt-infiltrated, solid state electrolyte (SSE) ionically coupling the anode electrode and the cathode electrode, wherein at least a portion of at least one of the electrode surfaces comprises an interphase layer separating the respective electrode active material from direct contact with the SSE, and wherein the interphase layer comprises two or more metals from the list of: Zr, Al, K, Cs, Fr, Be, Mg, Ca, Sr, Ba, Sc, Y, La or non-La lanthanoids, Ta, Zr, Hf, and Nb.

In some aspects, the at least one electrode surface comprises the anode electrode surface, the cathode electrode surface, or both.

In some aspects, where the interphase layer comprises a zirconium oxide or oxyfluoride, an aluminum oxide or oxyfluoride, or a combination thereof.

In some aspects, where the interphase layer is deposited by atomic layer deposition (ALD).

In some aspects, at least one of the electrodes comprises one, two or more polymer binders selected from the group of: polyvinylidene fluoride (PVDF), polyamideimide (PAI), polyether(ether)imide (PEI), polyether ether ketone (PEEK), aramid polymer, co-polyimide, poly(imide-co-amide), poly(imide-co-siloxane), polyester imide, polybenzimidazoles, polybenzothiazole, polybenzoxazoles, polybisthiazoles, polyhydrazides, polyquinaxolines, or other polyheterocycles polymers.

In some aspects, the cathode electrode exhibits areal capacity loading in excess of about 3 mAh/cm2.

In some aspects, the cathode electrode active material comprises nickel (Ni).

In some aspects, an atomic fraction of Ni in a composition of the cathode active material is more than about 80 at. %, relative to all transition metals in the cathode active material.

In some aspects, the anode electrode comprises conductive sp2-bonded carbon.

In some aspects, the anode electrode comprises porous anode particles, where at least a portion of a pore volume of the porous anode particles is configured to accommodate volume expansion of Li during SSLB charging.

In some aspects, the porous anode particles comprise Si.

In some aspects, the SSE exhibits a melting point below about 350° C.

In some aspects, the SSE exhibits a melting point below 250° C.

In some aspects, where the SSE comprises more than about 5 at. % Cl.

In some aspects, where the SSE comprise more than about 10 at. % Li.

In some aspects, where the SSE comprises more than about 10 at. % H.

In some aspects, the melt-infiltration of the SSE between the anode electrode and the cathode electrode is performed at a reduced pressure in a vacuum.

In some aspects, the reduced pressure is lower than about 0.01 atm.

In some aspects, a first charge the SSLB at a temperature that is above about ⅔ of a melting point of the SSE, in kelvin (K).

In some aspects, the temperature is above the melting point of the SSE.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The accompanying drawings are presented to aid in the description of embodiments of the disclosure and are provided solely for illustration of the embodiments and not limitation thereof. Unless otherwise stated or implied by context, different hatchings, shadings, and/or fill patterns in the drawings are meant only to draw contrast between different components, elements, features, etc., and are not meant to convey the use of particular materials, colors, or other properties that may be defined outside of the present disclosure for the specific pattern employed.

FIG. 1A illustrates a conventional ceramic ASSLB cell.

FIG. 1B illustrates a ceramic ASSLB cell in accordance with an embodiment of the disclosure.

FIG. 1C illustrates a layer of SSE powder deposited on top of a slurry-cast electrode in accordance with an embodiment of the disclosure.

FIG. 1D illustrates heat-induced melting of the SSE of FIG. 1C as the SSE is infiltrated into the electrode by means of capillary forces in accordance with an embodiment of the disclosure.

FIG. 1E illustrates cooling and solidification of the SSE of FIG. 1D, facilitating formation of a dense electrode with a melt-infiltrated SSE in accordance with an embodiment of the disclosure.

FIGS. 3A-3K illustrate electrode morphologies after melt-infiltration of SSE in accordance with embodiments of the disclosure.

FIGS. 5A-5E illustrate EDS mappings of individual elements of the LTE electrode in FIGS. 3E-3F.

FIGS. 8A-8L illustrate microstructural and thermal characterization of the SSE and the electrode materials before and after the melt-infiltration in accordance with an embodiment of the disclosure.

FIGS. 9A-9F illustrate the electrochemical performance of NCM$^{111}$-Li, LTO-Li and graphite-Li half cells with the electrodes filled with the SSE by using the melt-infiltration technology.

FIGS. 10A-10F illustrate electrochemical performance of NCM$^{111}$-Li, LTO-Li, graphite-Li half cells with a conventional liquid electrolyte (1M LiPF$_6$ in EC/DEC).

FIGS. 11A-11I illustrate electrochemical performance of NCM$^{111}$-LTO ASSLBs fabricated by melt-infiltration technology in accordance with an embodiment of the disclosure.

DETAILED DESCRIPTION

Figure 2A:
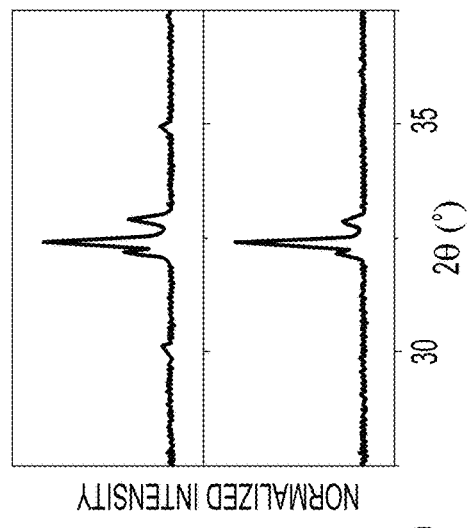
FIG. 2A-2E illustrate characteristics of an exemplary SSE compositions in accordance with embodiments of the disclosure.

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

While the description below may describe certain examples in the context of rechargeable (often called "secondary") Li and Li-ion batteries (for brevity and convenience, and because of the current popularity of Li technology), it will be appreciated that various aspects may be applicable to other rechargeable as well as co-called "primary" (non-rechargeable) batteries, such as secondary and primary metal and metal-ion batteries (such as Na and Na-ion, Mg and Mg-ion, Al and Al-ion, K and K-ion, Cs and Cs-ion, Ca and Ca-ion, Zn and Zn-ion and others).

While the description below may describe certain examples of the solid electrolytes in the context of cation-based (such as metal-ion, including Li-ion cation-based) electrolytes where cations (such as Li$^+$ cations and others) contribute to the vast majority (e.g., up to about 90-100%) of the total electrolyte ionic conductivity, it will be appreciated that various aspects may be applicable to solid electrolytes that either primarily (e.g., by about 90-100%) rely on anion conduction (such as F$^-$ or Cl$^-$ or OH$^-$ or other anion conduction) or exhibit mixed cationic and anionic conductivities, where each type of ions contribute to more than about 10% and less than about 90% of the total ionic conductivity.

While the description below may describe certain examples in the context of single phase (including a solid solution) electrolyte compositions, it will be appreciated that various aspects may be applicable to composition comprising two or three or even four distinct phases. Each phase may exhibit a different melting point, mechanical properties, microstructure, density, chemical composition and/or ionic conductivity.

While the description below may describe certain examples in the context of one type or composition of the electrolyte in cells, it will be appreciated that various aspects may be applicable to cells comprising two or three or more electrolyte compositions. Each electrolyte composition may exhibit a different melting point, mechanical properties, microstructure, density, chemical composition and/or ionic conductivity. In some designs, an anode may comprise a different electrolyte composition or different electrolyte mixture than a cathode or a separator membrane layer. Similarly, in some designs, a cathode may comprise a different electrolyte composition or different electrolyte mixture than an anode or a separator membrane layer.

While the description below may describe certain examples of cathode or anode materials in the context of certain types of intercalation-type electrode chemistries, it will be appreciated that various aspects may be applicable to various other types of intercalation-type cathode or anode chemistries as well as various types of conversion-type electrode chemistries.

While the description below may also describe certain examples of the cathode or anode material formulations (for use in combination with melt-infiltrated and other suitable solid electrolytes) in a Li-free state, it will be appreciated that various aspects may be applicable to various Li-containing electrodes (e.g., in either partially or fully discharged or partially or fully charged state). In some designs, it may be advantageous for the (full) cells to be filled with a solid electrolyte in a fully discharged state.

While the description below may describe certain cathode examples (for use in combination with melt-infiltrated and other suitable solid electrolytes) in the context layered intercalation cathodes, it will be appreciated that various aspects may be applicable for conversion-type or mixed conversion-intercalation type cathode chemistry, such as sulfur and $Li_2S$, selenium and $Li_2S_2$, metal fluorides of "pure" fluoride-based chemistry of active conversion-type cathode materials (e.g., LiF and Cu, LiF and Fe, LiF and Fe—Cu, $FeF_3$, $CuF_2$, $NiF_2$, $MnF_3$, $BiF_3$, $BiF_5$, Cu—Fe—F (note that "A-B-C- . . . " refers to the general composition comprising A, B, C, etc. without specifying the relative content of the A, B, C, and possibly other elements), Cu—Fe—Mn—F, Cu—Fe—Ni—F, Fe—Ni—F and many other "pure" metal fluoride-based chemistries based on one, two, three or more metals), as well as cathodes comprising metal oxyfluorides/oxy—fluorides (e.g., Cu—O—F, Fe—O—F, Fe—Cu—O—F, Bi—O—F, Bi—Fe—O—F, Bi—Fe—Cu—F, Fe—Al—O—F, Cu—Al—O—F, Fe—Ni—O—F, Cu—Ni—O—F, Fe—Cu—Al—O—F, Fe—Ni—Al—O—F, Fe—Ni—La—O—F, Fe—La—O—F, Cu—La—O—F, Fe—Cu—La—O—F, Cu—Li—O—F, Fe—Li—O—F, Fe—Cu—Li—O—F, Fe—Cu—La—Li—O—F, Fe—Cu—Al—Li—O—F, Fe—Cu—Mn—Li—O—F, Fe—Cu—Ni—Li—O—F, and other compositions comprising various metal cations and mixed F and O anions), metal chlorofluorides (e.g., Cu—Cl—F, Fe—Cl—F, Fe—Cu—Cl—F, Fe—Cu—Ni—Cl—F, Fe—Cu—Al—Cl—F, Cu—Li—Cl—F, Fe—Li—Cl—F, Fe—Cu—Li—Cl—F, Fe—Cu—Mn—Li—Cl—F, Fe—Cu—Ni—Li—Cl—F, and various other compositions comprising mixed F and Cl anions), metal bromo-fluorides (various compositions comprising metal(s) and mixed F and Br anions), metal hydro-fluorides (various compositions comprising metal(s) and hydrogen cations and F anions), metal hydroxy-fluorides (various compositions comprising metal(s) and hydrogen cations and mixed F and O anions), metal oxy-chloro-fluorides (various compositions comprising mixed F, Cl and O anions), metal oxy-bromo-fluorides (various compositions comprising mixed F, Br and O anions), metal sulfo-fluorides (various compositions comprising mixed F and S anions), metal sulfo-oxy-fluorides (various compositions comprising mixed F, O and S anions), their various mixtures, alloys and other combinations and other mixed anions' comprising conversion-type cathode compositions (including those that may comprise Li, H, none-Li alkali metals, alkaline earth metals, yttrium, lanthanum, lanthanoid metals and transition metals as well F, Cl, Br, O, S and/or Se nonmetals). In some designs, the atomic ratio of all the present nonmetals (e.g., O, S, Cl, Se and/or others) to F in the fluoride-based cathode material composition (e.g., the atomic ratio of O:F or the atomic ratio of (O and Cl and S and Se):F, etc.) may range from around $10^{-20}$ to around $7 \cdot 10^{-1}$. In some designs, the ratio of all the present non-Li metal atoms except for Cu, Ni and Fe (e.g., Mn, La, Al, H, Mg, Zr, Cr, Bi, etc.) to the sum of the Li, Cu, Ni and Fe atoms in the cathode material composition may range from around $10^{-20}$ to around $3 \cdot 10^{-1}$.

While the description below may describe certain cathode examples (for use in combination with melt-infiltrated and other suitable solid electrolytes) in the context of Li storage in the cathodes based on the transition metal (such as Cu, Fe, Mn, Ni, Bi, Co, etc.) reduction-oxidation (redox) reactions, it will be appreciated that various aspects may be applicable to materials where a portion of Li storage relies on the anion (such as oxygen, O, etc.) redox reactions in the cathodes. Examples of such materials may include various conversion-type or intercalation-type or mixed type cathode active materials that comprise both fluorine and at least one non-fluorine electronegative element that may exhibit multiple oxidation states, such as oxygen. In some designs, other (more rare) illustrative examples of such materials include those that in addition to metal(s) and fluorine also comprise sulfur or chlorine or other multivalent anions and their various combinations, etc.

While the description below may describe certain cathode examples (for use in combination with melt-infiltrated and other suitable solid electrolytes) in the context of "pure" conversion-type chemistry or "pure" intercalation-type chemistry of active cathode materials, it will be appreciated that various aspects may be applicable to mixed intercalation/conversion type active materials where both intercalation and conversion mechanisms of Li ion storage may take place during battery cell operation. Furthermore, in some designs, primarily (e.g., about 50-100%) intercalation-type mechanism(s) of Li ion storage may take place during some range of the cell charge or discharge (as an illustrative but not limited example, from around 0.0% to around 40.0% of the full discharge capacity). Similarly, in some designs, primarily (e.g., about 50-100%) conversion-type mechanism(s) of Li ion storage may take place during some range of the cell charge or discharge (as an illustrative but not limited example, from around 0.5% to around 100.0% of the full discharge capacity).

While the description below may describe certain anode examples (for use in combination with melt-infiltrated and other suitable solid electrolytes) in the context of "pure" conversion-type chemistry or "pure" intercalation-type chemistry or "pure" metal (e.g., Li) deposition chemistry or "pure" Li alloy chemistry of active anode materials, it will be appreciated that various aspects may be applicable to mixed type active materials where two or more of (e.g., (a) intercalation-type, (b) conversion-type, (c) metal (e.g., Li) deposition and (d) metal (e.g., Li) alloying) mechanisms of Li ion storage in the anode may take place during battery cell operation. Furthermore, in some designs, primarily (e.g., about 50-100%) one mechanism of Li ion storage (e.g., intercalation-type or conversion-type or alloying-type) may take place during some range of the cell charge or discharge (as an illustrative but not limited example, from around 0.0% to around 40.0% of the full discharge capacity). Similarly, in some designs, primarily (e.g., about 50-100%) another mechanism type (e.g., conversion-type or alloying-type or metal (e.g., Li) deposition) of Li ion storage may take place during some range of the cell charge or discharge (as an illustrative but not limited example, from around 0.5% to around 100.0% of the full discharge capacity).

While the description below may describe certain examples of Li-ion batteries without LiF-comprising cathodes and without Si-comprising anodes (for use in combination with melt-infiltrated and other suitable solid electrolytes), it will be appreciated that various aspects may be applicable to battery cells comprising Si in the anodes or LiF in the cathodes.

While the description below may describe certain examples in the context of particular electrode or electrode particle chemistry, composition, architecture and morphology, certain examples in the context of particular electrode synthesis steps or particular electrode particle(s) synthesis steps, certain examples in the context of particular electrode porosity or particular porosity of particles (within the electrode), certain examples in the context of particular shape or particular size of particles (within the electrode), certain examples in the context of particular electrode surface chemistry or surface morphology, certain examples in the context of particular electrolyte composition, certain examples in the context of particular electrolyte incorporation into an electrode or a battery cell, it will be appreciated that various aspects may be applicable to battery cells that advantageously incorporate various combinations of some of the described electrode chemistries, composition, architecture, size, porosity and shape as well as electrolyte composition and electrode or cell manufacturing techniques.

While the description below may describe certain examples of separators composed only of the solid electrolyte material or in the context of a particular thermally-stable porous separator chemistry (e.g., $Al_2O_3$, AlFO (or, more broadly, $AlF_xO_y$, where $2y+1x=3$), AlO(OH), $Al(OH)_3$, $LiAlO_2$, $LiAl_5O_8$, MgO, $MgF_{x1}O_{y1}$ where $2y_1+1x_1=2$, ZrO, $ZrF_{x1}O_{y1}$ where $2y_1+1x_1=2$, other metal oxides and oxyfluorides, thermally stable polymers coated or polymers coated with or infiltrated with ceramic, their various mixtures and combinations, etc.) or morphology (e.g., particles, nanoparticles, fibers, nanofibers, nanowires, whiskers, nanoflakes, nanoplatelets, platelets, nanoparticles of irregular shape, etc.; nonwoven, etc.) for use in combination melt-infiltrated electrolyte compositions, it will be appreciated that various aspects may be applicable to other types or chemistries or morphologies of thermally stable separators and also to the lack of standalone separators.

While the description below may describe certain examples of the electrolyte composition and properties for melt-infiltration into a separator or a cathode or an anode or their various combinations (including melt-infiltration into a battery stack or roll, etc.), it will be appreciated that various aspects may be applicable to the electrolytes of the described compositions or properties that are incorporated into cells by other (not melt-infiltration) means (e.g., as standalone or electrode-coated membranes, as current collector-deposited/coated layer, by solution infiltration, by slurry casting, by sputtering, by spraying, by electrodeposition, by electroless deposition, by layer-by-layer deposition, by various vapor deposition means (such as chemical vapor deposition CVD, physical vapor deposition PVD, atomic layer deposition ALD, etc.), among others).

While the description below may describe certain examples in the context of melt-infiltration electrolyte filling methodologies for cell fabrication, it will be appreciated that various aspects may be applicable to other methodologies of electrolyte filling (or, more generally, electrolyte incorporation) for cell fabrication.

While the description below may describe certain examples of electrolyte composition(s) that may be used to attain certain suitable electrolyte properties for effective cell (e.g., Li or Li-ion cell) design, it will be appreciated that in some designs other electrolyte compositions may be selected in order to achieve suitable electrolyte properties for cell design and manufacturing.

While the description below may describe certain examples of cells (e.g., Li or Li-ion cells, Na or Na-ion cells, etc.) comprising a single electrolyte, it will be appreciated that two or more distinct electrolyte compositions may be used within an individual cell.

While the description below may describe certain examples of cells (e.g., Li or Li-ion cells) comprising only a solid (e.g., at room temperature) electrolyte, it will be appreciated that various aspects may be applicable to cells comprising both solid and liquid electrolyte(s) (e.g., at room temperature).

While the description below may describe certain examples of cells (e.g., Li or Li-ion cells) comprising only inorganic solid (at room temperature) electrolyte, it will be appreciated that various aspects may be applicable to cells comprising organic (e.g., solid polymer or polymer gel or other types of organic) or mixed (organic-inorganic) electrolyte(s).

For example, in one or more embodiment of the present disclosure the polymer, polymer gel or mixed polymer-ceramic electrolytes may exhibit mostly single Li-ion conducting properties in which anion anchored to the backbone or side chain of a polymer may be utilized. Specific example of the anion anchored group may comprise imide, sulfonamide, carboxylate, sulfonate. In some embodiments, the single Li-ion conducting properties might be achieved by utilizing ceramic particles in polymer ceramic composite in which anion anchoring goes through the interaction with ceramic surface. In some embodiments, the single Li-ion conducting polymers or ionomers may exhibit transference number in the range from about 0.8 to about 1.0 (unity) Illustrative examples of ionomers in the polymer may include but not limited to polymers functionalized Li-imide, Li-sulfonamide, Li-carboxylate, or Li-sulfonate groups in backbone or in side-chain positions. In some embodiments, the cation groups may comprise Li-ion, Na-ion, K-ion, Cs-ion, Ca-ion, Ba-ion, Zn-ion, Mg-ion, Al-ion, or other metal ions. In some embodiments, the ionomers may preferably exhibit thermally stable properties (not losing more than about 5-15 wt. % upon heating in an inert environment) in the temperature range from about 100 to about 350° C.

While the description below may describe certain examples of the electrode binders as those comprising polyvinylidene fluoride (PVDF) polymer or polyamideimide (PAI) polymer or their mixtures, it will be appreciated that various aspects may be applicable to electrode binders comprising other polymer compositions or their mixtures as soon as these demonstrate adequate thermal stability for cell fabrication at suitable elevated temperatures.

Illustrative examples of thermally stable polymer binders may include but not limited to: co-polyimide, poly(imide-co-amide), poly(imide-co-siloxane), polyester imide, polybenzimidazoles, polybenzothiazole, polybenzoxazoles, polybisthiazoles, polyhydrazides, polyquinoxalines, or other polyheterocycles and others. In one or more embodiments of this invention at least a portion of the polymer binder composition may be deposited using physical vapor deposition, spray drying or solution deposition. In some embodiments, the ionomers may preferably exhibit thermally stable properties (not losing more than 5-15 wt. % upon heating in an inert environment) in the temperature range from about 100 to about 450° C.

While the description below may describe certain examples of cells (e.g., Li or Li-ion cells) that comprise electrolyte that is solid at room temperature and is solid at operating temperatures, it will be appreciated that various aspects may be applicable to cells comprising electrolyte that is solid at room temperature, but may become viscous glass or liquid at least at some operating temperatures.

Any numerical range described herein with respect to any embodiment of the present invention is intended not only to define the upper and lower bounds of the associated numerical range, but also as an implicit disclosure of each discrete value within that range in units or increments that are consistent with the level of precision by which the upper and lower bounds are characterized. For example, a numerical distance range from 7 nm to 20 nm (i.e., a level of precision in units or increments of ones) encompasses (in nm) a set of [7, 8, 9, 10, . . . , 19, 20], as if the intervening numbers 8 through 19 in units or increments of ones were expressly disclosed. In another example, a numerical percentage range from 30.92% to 47.44% (i.e., a level of precision in units or increments of hundredths) encompasses (in %) a set of [30.92, 30.93, 30.94, . . . , 47.43, 47.44], as if the intervening numbers between 30.92 and 47.44 in units or increments of hundredths were expressly disclosed. Hence, any of the intervening numbers encompassed by any disclosed numerical range are intended to be interpreted as if those intervening numbers had been disclosed expressly, and any such intervening number may thereby constitute its own upper and/or lower bound of a sub-range that falls inside of the broader range. Each sub-range (e.g., each range that includes at least one intervening number from the broader range as an upper and/or lower bound) is thereby intended to be interpreted as being implicitly disclosed by virtue of the express disclosure of the broader range. In yet another example, a numerical range with upper and lower bounds defined at different levels of precision shall be interpreted in increments corresponding to the bound with the higher level of precision. For example, a numerical percentage range from 30.92% to 47.4% (i.e., levels of precision in units or increments of hundredths and tenths, respectively) encompasses (in %) a set of [30.92, 30.93, 30.94, . . . , 47.39, 47.40], as if 47.4% (tenths) was recited as 47.40% (hundredths) and as if the intervening numbers between 30.92 and 47.40 in units or increments of hundredths were expressly disclosed.

Solid electrolytes may provide some advantages for Li and Li-ion cells, such as stability against oxidation at high cathode potentials, reduced undesirable side reactions between the cathode and electrolyte, reduced undesirable side reactions between the anode and electrolyte, and enhanced safety. Examples of known solid ceramic electrolytes include sulfide-based electrolytes (such as $Li_2S$—$P_2S_5$, $Li_2S$—$Ga_2S_3$—$GeS_2$, $Li_2S$—$SiS_2$, etc.), halide-based electrolytes, oxide-based electrolytes (such as Li—La—Ti—O garnet, Li—La—Ta—O garnet, Li—Si—O glass, Li—Ge—O glass, $Li_9SiAlO_8$, etc.), mixed sulfide-oxide electrolytes (such as $Li_2S$—$SiS_2$—$Li_4SiO_4$, LiI—$La_2O_2S$—$La_2O_2S_2$, etc.), oxy-chloride and oxy-hydro-chloride electrolytes (such as $Li_3OCl$ electrolyte, $Li_2OHCl$ electrolyte, $Li_3(OH)_2Cl$ electrolyte, etc.), borohydrides (such as $LiBH_4$—LiCl), and others.

Conventional solid electrolytes and solid state Li or Li-ion cells (batteries) typically suffer from various limitations, such as (i) low ionic conductivity (and thus low rate performance of solid cells), particularly at low temperatures (e.g., below around 0° C.); (ii) low practically-achievable energy density (e.g., due to the typically used milling procedure for the fabrication of electrodes with solid electrolytes, which requires excessive content of conductive additives and electrolyte for achieving reasonable rate performance and high capacity utilization); (iii) large thickness (e.g., typically above 50 microns) of the electrolyte (separator) membranes (e.g., due to the typical formation of such solid membranes by sintering solid electrolyte powders), which increases the volume occupied by the inactive material, thus increasing cell cost and reducing cell energy density; (iv) the brittle nature of the ceramic solid electrolytes and solid-state batteries, which limits their applications and life; (v) the lack of flexibility in typical solid-state batteries with solid ceramic electrolytes, which limits their applications and life; (vi) typically rather high interface resistance between the solid electrolyte and the electrode materials (e.g., anode or cathode, or both), which limits their rate performance and temperature of efficient operation; (vii) often high reactivity of the solid electrolytes with many typically used electrode materials and current collectors (particularly for sulfide and chloride-comprising electrolytes), which may induce corrosion and other undesirable reactions during heating of the cell during fabrication or even during use at elevated temperatures (e.g., typically above around 50° C.); (viii) often high reactivity of many solid electrolytes with air and moisture, which often requires electrodes comprising solid state electrolyte to be produced in dry-rooms or gloveboxes (which may be prohibitively expensive for many applications and not practical); (ix) penetration of solid electrolytes by metal dendrites (e.g., Li dendrites in the case of Li metal batteries or Na dendrites in case of Na metal batteries) during cycling, which may induce self-discharge, battery failure and safety hazards; (x) cracks and defects forming at the interface between the solid electrolyte and electrode materials (e.g., due to substantial volume changes (e.g., above 2%) in many electrode materials during cycling, which most solid electrolytes fail to accommodate) leading to capacity fading, resistance growing and failures; (xi) various mechanical and electrochemical instabilities due to difficulty of the solid electrolytes to accommodate volume or shape changes in the electrode materials during cycling or electrochemical or chemical instabilities of the solid electrolyte in contact with metal anodes (e.g., Li or Na anodes), particularly in case of metal anode plating; (xii) in some cases high toxicity of the products of the reaction of the solid electrolyte with moisture (e.g., during cell stack assembling or handling the solid electrolyte membranes in air); among others. In addition, conventional solid-state Li or Li-ion batteries cannot typically be used with conversion-type (including alloying-type) active electrode materials (due to the undesirable interactions with such materials and due to the dramatic volume changes in such active materials (e.g., about 15-400%), which cannot be accommodated by solid electrolytes in typical cells). Furthermore, some conventional solid-state Li-ion batteries cannot utilize graphite (or, more generally, carbon-based) anodes due to the poor interface (high resistance). Similarly, most conventional solid-state Li or Li-ion batteries often cannot be used with high voltage (greater than around 4 V vs. Li/Li+) cathode materials (e.g., with high voltage polyanion cathodes). In addition, conventional solid-state are often incorporated into cells as stand-alone membranes, which are extremely expensive to produce with sufficiently (for most applications) low areal density/concentration of defects (e.g., small cracks, small holes or pores, grain boundaries, excessive roughness on the surface, among others), which may lead to low cell fabrication yield and low cycle life. Finally, many conventional designs of the solid-state Li batteries require the use of liquid electrolyte in the cathode. Such designs often suffer from liquid electrolyte flammability, relatively low oxidation stability of the liquid electrolyte (particularly at high voltages), often undesired reactivity with the cathode material, often gassing, often leakage and/or other limitations. Conventional solid-state Li or Li-ion batteries (particularly with ceramic or inorganic solid-state electrolytes) cannot be produced in wound (e.g., cylindrical) configurations. One or more embodiments of the present disclosure are directed to routes (e.g., materials, cell designs and/or cell fabrication methodologies) to overcome (or at least reduce reduce) some or all of the above-noted limitations of conventional solid-state cells and solid-state electrolyte compositions.

One aspect of the present disclosure includes the use of mixed (a combination of two, three or more) polymer binder(s) in the same electrode and the use of mixed polymer-ceramic binders for thermally stable electrode materials.

Another aspect of the present disclosure includes the use of mixed metal oxides for the deposition of ceramic layer on the surface of the binder, conductive additives, active electrode materials and/or the whole electrode. Such mixed metal oxides may comprise two, three or more metals. In some designs, a layer of one or more metal oxide may be advantageously deposited on the surface of another one or more metal oxide to attain a unique combination of properties (e.g., good adhesion, more uniform coverage, better chemical stability, better resistance to dissolution into a molten or solid electrolyte, better electrochemical resistance, lower charge transfer resistance, etc.) that are either not attainable when using a single metal oxide layer or that not attainable when using the same deposition time or the same deposition thickness.

In some designs, instead of the (e.g., mixed) metal oxide(s), the layer may comprise metal oxy-fluoride or oxy-chloride or oxy-fluoro-chloride or oxy-nitride or oxy-fluoro-nitride or sulfide or selenide or oxy-sulfide or oxy-selenide or sulfo-selenide or phosphide or other (e.g., ceramic) compounds comprising one or more of oxygen (O), fluorine (F), chlorine (Cl), nitrogen (N), sulfur (S), selenium (Se) and phosphorous (P).

In some designs, the metal oxide (or, more generally, ceramic) surface layer may advantageously comprise zirconium (Zr) metal. In some designs, the metal oxide (or, more generally, ceramic) surface layer may advantageously comprise zinc (Zn) metal. In some designs, the metal oxide (or, more generally, ceramic) surface layer may advantageously comprise aluminum (Al) metal. In some designs, such a layer may comprise Y, La or lanthanoids. In some designs, the layer may comprise lithium (Li) or magnesium (Mg) or sodium (Na) or their combination in its composition.

In some designs, the average thickness of the metal oxide (or, more generally, ceramic) surface layer (e.g., on the surface of the binder, active material or conductive additives) may advantageously range from around 0.5 nm to around 50.0 nm.

In some designs, at least a portion of the metal oxide (or, more generally, ceramic) surface layer (e.g., on the surface of the binder, active material or conductive additives for improved thermal stability, chemical stability, electrochemical stability, wetting, etc.) may be advantageously deposited from the vapor phase (e.g., by means of ALD or CVD or other suitable techniques). In some designs, at least a portion of such a layer may be deposited by using a layer-by-layer deposition. In some designs, at least a portion of such a layer may be deposited by spraying, by electrodeposition or by electroless deposition.

In some designs, at least a portion of the protective or functional surface layer (e.g., comprising metal oxide or, more generally, ceramic material) may comprise one, two or more of the metals selected from the group of: Zr, Al, K, Cs, Fr, Be, Mg, Ca, Sr, Ba, Sc, Y, La or non-La lanthanoids, Ta, Zr, Hf, and Nb.

In some designs, at least a portion of the protective or functional surface layer (e.g., comprising metal oxide or, more generally, ceramic material) may also comprise pores. Such pores may help accommodate interface stresses during cycling or provide other benefits.

In some designs, the protective or functional surface layer may be characterized as an interphase layer. In some designs, at least a portion of at least one of the electrode surfaces (e.g., anode electrode, cathode electrode, or both) may comprise the interphase layer (e.g., separating the respective electrode active material from direct contact with the SSE). In some designs, the interphase layer may comprise two or more metals from the list of: Zr, Al, K, Cs, Fr, Be, Mg, Ca, Sr, Ba, Sc, Y, La or non-La lanthanoids, Ta, Zr, Hf, and Nb. In some designs, the interphase layer may comprise a zirconium oxide or oxyfluoride, an aluminum oxide or oxyfluoride, or a combination thereof.

In some designs, the interphase layer may be deposited by ALD. ALD can be used to deposit very conformal, dense and uniform coatings. In some designs ALD may be preferable for the deposition on porous substrates (e.g., porous electrodes) in terms of very uniform and tightly controlled thickness of the deposited layer. In some designs, this thickness uniformity can be used to infer that ALD was used for the deposition of the interphase layer. Hence, ALD may be used to create interphase layers that could not practically be achieved using other deposition techniques, in some applications.

In some designs, at least one of the electrodes (e.g., cathode electrode, anode electrode, or both) may comprise one, two or more polymer binders selected from the group of: polyvinylidene fluoride (PVDF), polyamideimide (PAI), polyether(ether)imide (PEI), polyether ether ketone (PEEK), an aramid polymer, co-polyimide, poly(imide-co-amide), poly(imide-co-siloxane), polyester imide, polybenzimidazoles, polybenzothiazole, polybenzoxazoles, polybisthiazoles, polyhydrazides, polyquinaxolines, or other polyheterocycles polymers.

A conventional way to producing solid-state batteries (batteries comprising solid electrolyte) or batteries comprising mixed solid and liquid electrolytes comprise formation of a standalone solid-state electrolyte (SSE) membrane that separates anode and the cathode by preventing electrons from moving between them while allowing active ions (e.g., Li ions) to pass through. A conventional way to producing all solid-state batteries also comprises mixing active materials with solid electrolyte powders and conductive additives, casting the slurry onto the current collector and sintering these. Both of these conventional approaches are complex, expensive, and often suffer from low yield and limitations in terms of the attainable energy and power densities. For example, the volume fraction of active material in the conventionally produced solid state electrodes is often limited to about 25-60 vol. % to achieve a satisfactory conductivity and rate performance. However, this is significantly lower than the about 65-90 (often 75-90) vol. % of active material found in certain electrodes for use with liquid electrolytes. Similarly, the SSE separator membrane is conventionally prepared by sintering or pressing the SSE into the solid membrane material, typically about 50-150 microns in thickness, which is higher than the about 6-20 micron membranes used in conjunction with liquid electrolytes. These limitations may significantly increase the volume needed to store energy and thus reduce the energy density of the solid-state cells with SSE. In many cases, lower energy density also leads to a higher price, which is also undesirable. In addition, in most conventional designs, the expensive application of very high pressures and temperatures (often in controlled environments) are required for the fabrication of fully dense solid-state batteries.

Various solutions for rechargeable all-solid-state lithium (Li) ion and Li metal batteries (ASSLBs) have been explored in hope to reduce cost, increase energy density and most importantly improve the safety of batteries for electric ground and aerial vehicles. Despite such potential advantages, currently explored ASSLB manufacturing technologies not only are fundamentally more expensive, but they fail to even match the volumetric performance characteristics of commercial high-energy cells.

Inorganic (e.g., ceramic) SSEs offer higher conductivities for faster charging and typically better (although still insufficient) resistance to Li dendrite penetration for improved ASSLB durability and safety than polymer SSEs. However, the high melting point of the majority of conventional ceramic SSEs in combination with their poor wetting on the surface of active materials typically requires unrealistically high (for low-cost mass production) pressure and temperature processing of the ASSLB cathodes to reduce their interfacial resistance to somewhat acceptable levels. The highest conductivity inorganic sulfide-based SSEs additionally suffer from very high reactivity with moisture and require electrode processing and cell assembling in an extremely dry environment, which increases fabrication costs further.

The poor volumetric energy storage characteristics of conventional ceramic ASSLBs are the result of the manner in which they are fabricated, which involves separate fabrications of sintered SSE membranes and sintered ASSLB electrodes, which are then sandwiched between current collectors and carefully sintered together. Because ceramic is brittle and comprises defects that may induce cracking under stresses during cell assembling and use, SSE membranes are typically made relatively thick (e.g., greater than about 100 μm, an order of magnitude thicker than porous polymer membranes used in commercial Li-ion cells), which takes extra space and mass. Because ceramic is hard and thus difficult to plastically deform, researchers need to use very large volume fractions of ceramic SSE in ASSLB cathodes to ensure all active particles being surrounded by the electrolyte.

FIG. 1A illustrates a conventional ceramic ASSLB cell. The undesirable excess of the SSE in such cells contrasts sharply with commercial Li-ion cells where liquid electrolyte easily infiltrates into the smallest pores of a separator and between densely compacted active particles.

FIG. 1B illustrates a ceramic ASSLB cell in accordance with an embodiment of the disclosure. The ASSLB cell of FIG. 1B comprises an identical electrode loading as the ASSLB cell of FIG. 1A, except that the ASSLB cell of FIG. 1B is prepared by melt-infiltration and offers a higher energy density, reduced consumption of the SSE and cheaper manufacturing.

In some ways, the melt-infiltration approach is similar to the low-cost fabrication of commercial Li-ion cells with liquid electrolyte, except that SSEs with relatively low melting points may be used to infiltrate into electrodes at moderately elevated temperatures (e.g., about 300-400° C. or below) in a liquid state and then solidify during cooling (e.g., see FIGS. 1C-1E). In particular, a layer of the SSE powder may be deposited on the top of a slurry-cast electrode (FIG. 1C), heat-induced melting of the SSE infiltrates it into the electrode by means of capillary forces (FIG. 1D), and cooling and solidification of the SSE enables formation of a dense electrode with a melt-infiltrated SSE (FIG. 1E). As such, in some designs, nearly the same commercial equipment as used for liquid electrolyte infiltration could be used for electrode and cell manufacturing in accordance with melt-infiltration of SSE, which reduces "barrier" for industry adoption. Melt-infiltration of SSE may also facilitate higher volumetric energy density and the formation of low-resistance interfaces between the SSE and active materials.

In some designs, an anti-perovskite SSE with a (for attaining higher uniformity and higher conductivity) composition of $Li_{1.9}OHCl_{0.9}$ may be used. $Li_{1.9}OHCl_{0.9}$ exhibits a low melting point of about 300° C., a low density of about 1.7 g cc$^{-3}$, and can be rapidly and cheaply produced from low-cost ingredients, which may be beneficial for battery pack cost reduction. Some other low-melting point (LMP) SSEs may also be configured with a relatively high conductivity (e.g., in the range from about $10^{-6}$ S·cm$^{-1}$ to about $5*10^{-3}$ S·cm$^{-1}$ at 60° C.) for relatively low melting point SSEs (e.g., below about 300-400° C.).

Figure 2B:
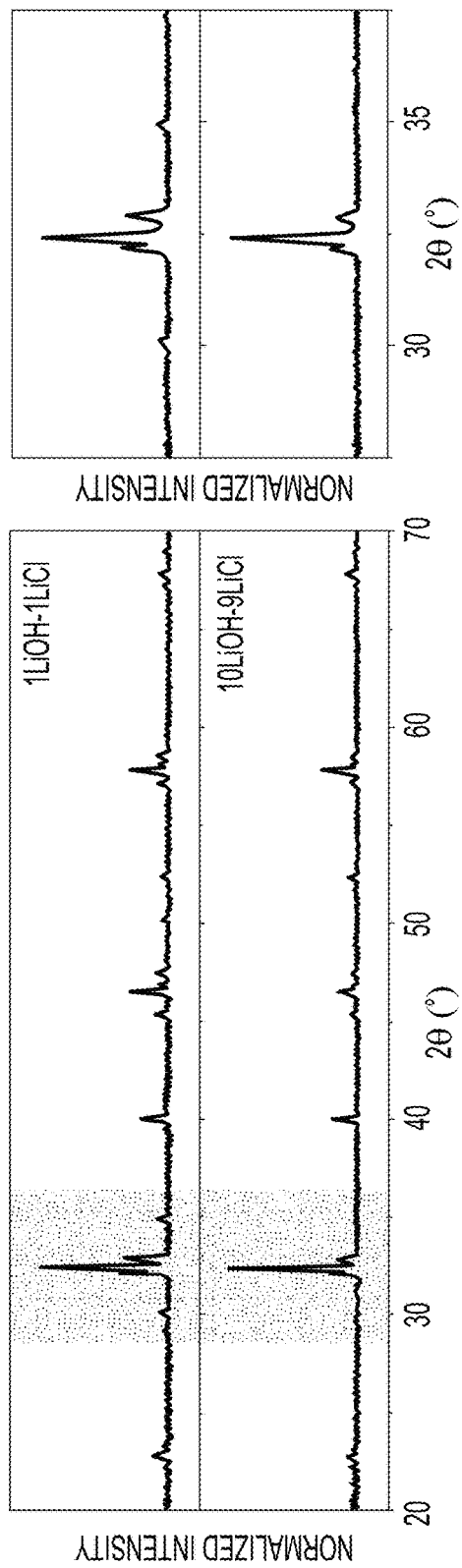
Figure 2C:
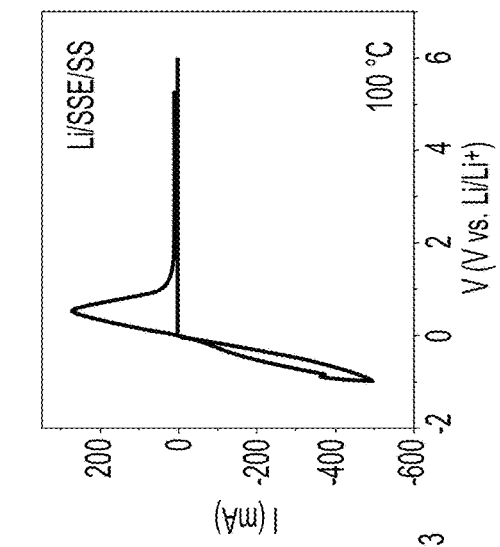
Figure 2D:
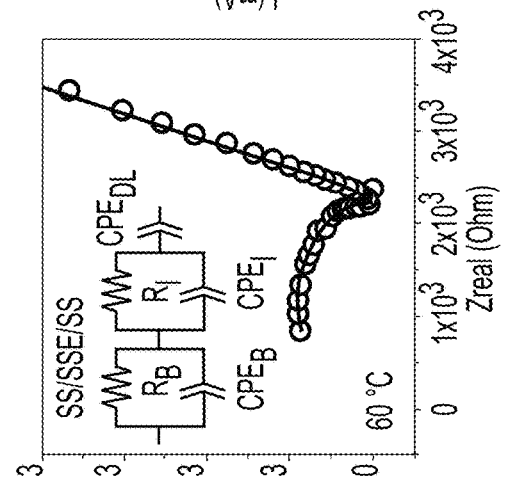
Figure 2E:
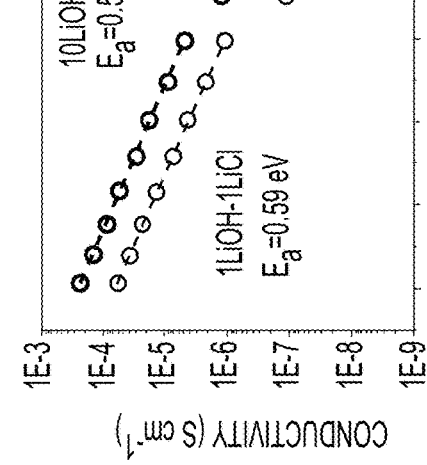

FIG. 2A-2E illustrate characteristics of an exemplary SSE compositions in accordance with embodiments of the disclosure. FIG. 2A illustrates XRD spectra of the SSEs of the compositions 1LiOH-1LiCl ($Li_2OHCl$) and 10LiOH-9LiCl ($Li_{1.9}OHCl_{0.9}$) in the 20-70° 2θ range. FIG. 2B illustrates XRD spectra of the SSEs of the compositions 1LiOH-1LiCl ($Li_2OHCl$) and 10LiOH-9LiCl ($Li_{1.9}OHCl_{0.9}$) in the 27.5-37.5° 2θ range. FIG. 2C illustrates Arrhenius conductivity plots for 1LiOH-1LiCl ($Li_2OHCl$) and 10LiOH-9LiCl ($Li_{1.9}OHCl_{0.9}$) SSE compositions with calculated activation energies (Ea). FIG. 2D illustrates a Nyquist plot generated from the stainless steel (SS)/$Li_{1.9}OHCl_{0.9}$/SS cell with an equivalent circuit model in the inset. SS—stainless steel. FIG. 2E illustrates a cyclic voltammetry curve for $Li_{1.9}OHCl_{0.9}$ at 100° C.

To demonstrate a compatibility of the melt-infiltration with commercial electrode fabrication processes, electrodes from widely used commercial cathode materials, such as layered lithium nickel manganese cobalt oxide (e.g., $LiNi_{0.33}Mn_{0.33}Co_{0.33}O_2$ (NCM$^{111}$)), and anode materials, such as $Li_4Ti_5O_{12}$ (LTO) and graphite (C) using the slurry preparation with carbon black additives and binders followed by casting and calendaring, were used (see Working Example, below). In some designs, metal nanowires (e.g., Zn or Al or Cu or Ti, depending on the electrode) or carbon nanofibers or carbon nanotubes may be used instead of or in addition to carbon black conductive additives. Other cathode material compositions, such as layered lithium nickel oxide (LNO), lithium cobalt oxide (LCO), higher nickel content NCM (NCM532, NCM622, NCM811, NCM90, others with Ni content in excess of about 85 or about 90 or even about 95% relative to all transition metals in the cathode active materials), lithium nickel cobalt aluminum oxides (NCA), lithium nickel cobalt aluminum manganese oxides (NCMA), lithium manganese oxide (LMO), lithium iron phosphate (LFP), lithium nickel phosphate (LNP), lithium cobalt phosphate (LCP) and other intercalation-type cathodes and their various combinations and mixtures may similarly be utilized, although sometimes SSE composition may need to be adjusted to attain better compatibility with such cathode materials. In some designs, conversion-type cathodes (e.g., $Li_2S$-based or metal fluorides, such as Fe/3LiF or Fe/2LiF or, more generally, M/xLiF, where M is a transition metal and x ranges from 1 to 5; or iron-containing metal oxyfluorides; and many others) may be used instead or in addition to intercalation-type cathodes.

Similarly, porous carbon (carbon comprising one or more pores, such as hollow or porous carbon (including but not limited by carbon doped and heavy doped by nitrogen, potassium, boron and other known dopants) particles or activated carbon or templated (e.g., by using soft or hard, such as oxide, templates or other pore-inducing templating means) porous carbon or carbon oxide or porous multi-layered graphene or graphene oxide particles or other porous particles may be used instead of LTO or graphite for the formation of lithium-metal batteries with such a solid electrolyte, where lithium metal is plated from the cathode into (e.g., internal) pores of the particles. In some designs, it may be advantageous for such porous carbon or carbon oxide or carbon nitride or other carbon-containing porous particles to exhibit good wetting by molten lithium metal (e.g., wetting angle between 0.0 and 90.0° at 300° C., in some designs, from 0.0 and 65.0° at 300° C.; in some designs, from 0.0 and 45.0° at 300° C.). In some designs, the internal pores of such particles may comprise Li-alloying materials that may either be used as nucleation sites for Li metal deposition during cell charging or be used to form Li alloys (such as Li—Si or Li—Ge or Li—Sn or Li—Sb, etc.) during cell charging or both.

In some designs, the anode electrode may comprise porous anode particles (e.g., porous Si-comprising active material particles), where at least a portion of a pore volume of the porous anode particles is configured to accommodate volume expansion of Li during SSLB charging.

In some designs, electrode may be densified (be calendared) prior to electrolyte melt-infiltration. In some designs, the volume fraction of active material particles in the electrodes prior to SSE melt-infiltration may advantageously range from around 65 vol. % to around 98 vol. %. In some designs, the volume fraction of active material particles in the electrodes after the SSE melt-infiltration may advantageously range from around 60 vol. % to around 96 vol. %.

FIGS. 1C-1E illustrates the simplicity of the melt-infiltration process, where rapid heating of the SSE powder dry cast onto the surface of NCM, graphite and LTO electrodes (FIG. 1C) to about 300° C. quickly melts the SSE powder (FIG. 1D). Through the capillary effect, the molten SSE rapidly infiltrates into the pores of the electrodes, as demonstrated in the video. The melt-infiltrated electrodes maintain the structure and rigidity with no observable delamination (FIG. 1E). A modification of such a melt-infiltration process could be used in infiltrating stacked thermally stable anode/thermally stable separator/thermally stable cathode layers, where molten electrolyte is introduced/infiltrated into pre-heated stack or jelly roll or dry cylindrical, pouch, coin or prismatic cell (e.g., from the edge). In some designs, after melt infiltration by the molten electrolyte the cell may be rapidly quenched (e.g., cooled down to below the SSE solidification). In some designs, fast quenching rate (e.g., time within 0.001 to 30 sec) may be advantageously utilized for rapid solidification. Such a rapid cooling may favor favorable SSE phase formation or prevent formation of large crystals or enhance ionic conductivity or provide other benefits (e.g., lower resistance, better cell stability, etc.).

Figure 3J:
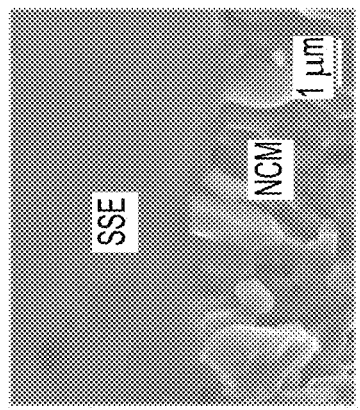
Figure 3I:
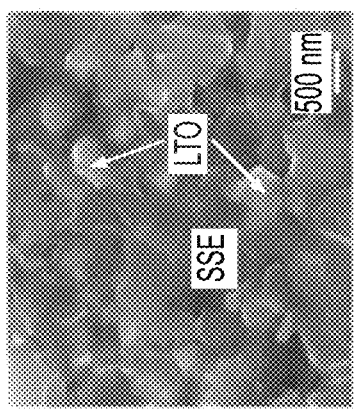
Figure 3K:
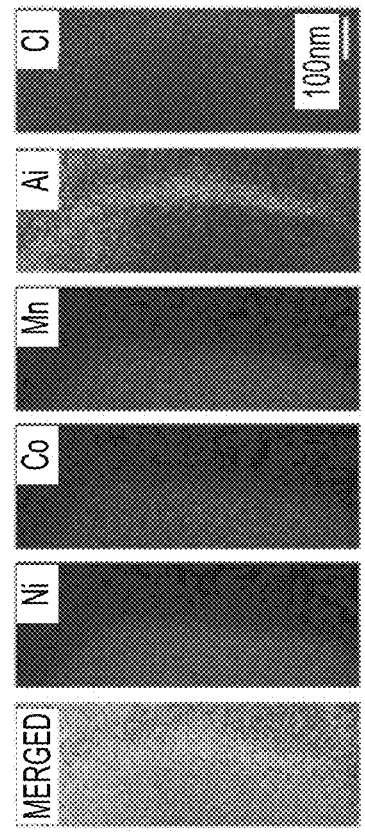

FIGS. 3A-3K illustrate electrode morphologies after melt-infiltration of SSE in accordance with embodiments of the disclosure. FIG. 3A illustrates scanning electron microscopy (SEM) cross-section of NCM$^{111}$ electrode after the melt-infiltration; vertical EDS line scans show Ni (NCM, pink) and Cl (SSE, green). FIG. 3B illustrates EDS mapping of the melt-infiltrated NCM$^{111}$ electrode, where pink color represents Ni/Co/Mn-combined (NCM$^{111}$) and green color represents Cl (SSE). c, SEM cross-section of graphite electrode after the melt-infiltration with vertical EDS line scans of representing C (blue) and Cl (green). FIG. 3D illustrates EDS mapping of the melt-infiltrated graphite electrode, where blue color represents C (graphite) and green color represents Cl (SSE). FIG. 3E illustrates SEM of LTO electrode after the melt-infiltration; vertical EDS line scans show Ti (red) and Cl (green). FIG. 3F illustrates EDS mapping of the melt-infiltrated LTO electrode, where red color represents Ti/O-combined (LTO) and green color represents Cl (SSE). FIG. 3G illustrates SEM of an ASSLB cell with NCM$^{111}$ cathode and LTO anode prepared by the melt-infiltration technique. FIG. 3H illustrates EDS mapping of the cross-section of the cell, where pink color represents Ni/Co/Mn-combined (NCM$^{111}$), red color represents Ti/O-combined (LTO), and green color represents Cl (SSE). FIG. 3I illustrates SEM of the LTO-Li$_{1.9}$OHCl$_{0.9}$ interface and FIG. 3J illustrates SEM of the NCM$^{111}$-Li$_{1.9}$OHCl$_{0.9}$ interface showing perfect wetting. FIG. 3K illustrates high-resolution EDS mapping of the interface between NCM$^{111}$ particle and SSE after the melt-infiltration.

Figure 4A:
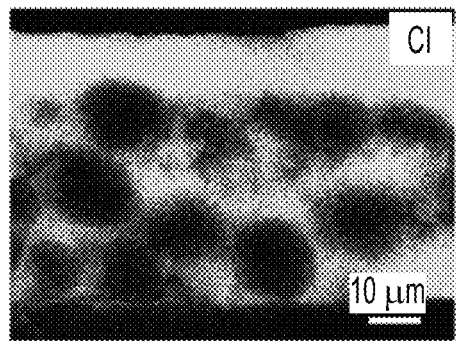
FIGS. 4A-4E illustrate EDS mappings of individual elements of the NCM$^{111}$ electrode in FIGS. 3A-3B.
Figure 4B:
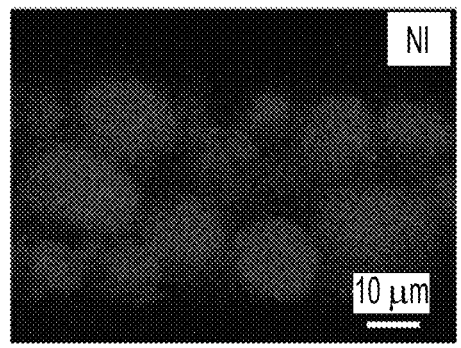
Figure 4D:
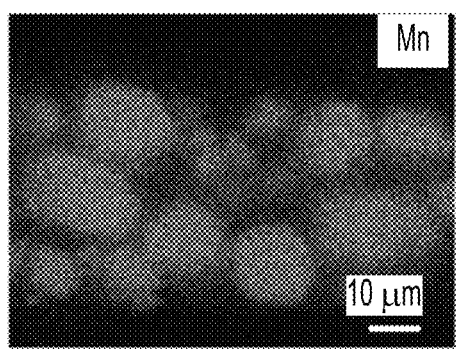
Figure 4C:
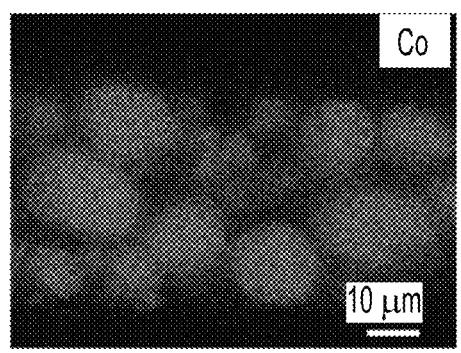
Figure 4E:
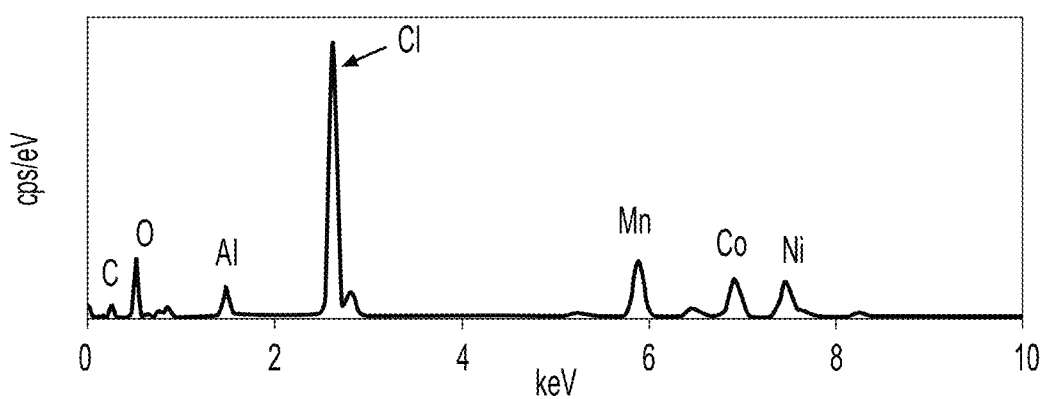

FIGS. 4A-4E illustrate individual EDS mappings of elements of the NCM$^{111}$ electrode in FIGS. 3A-3B. In particular, EDS mappings of Cl (FIG. 4A), Ni (FIG. 4B), Mn (FIG. 4C), Co (FIG. 4D) of the electrode in FIGS. 3A-3B, and FIG. 4E illustrates EDS spectrum of the electrode in FIGS. 3A-3B.

FIGS. 5A-5E illustrate EDS mappings of individual elements of the LTE electrode in FIGS. 3E-3F. In particular, EDS mappings of Cl (FIG. 5A), O (FIG. 5B), Al (FIG. 5C), Ti (FIG. 5D) of the electrode in FIGS. 3E-3F, and FIG. 5E illustrates EDS spectrum of the electrode in FIGS. 3E-3F.

Figure 6A:
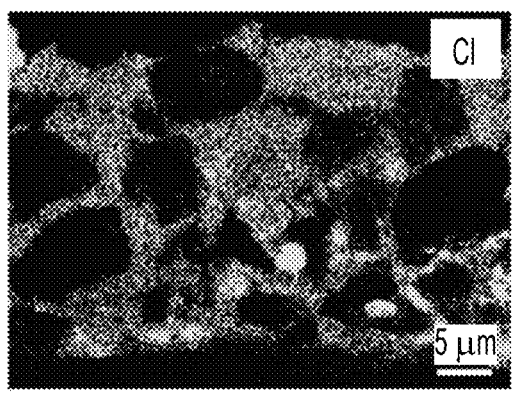
FIGS. 6A-6E illustrate EDS mappings of individual elements of the graphite electrode in FIGS. 3C-3D.
Figure 6B:
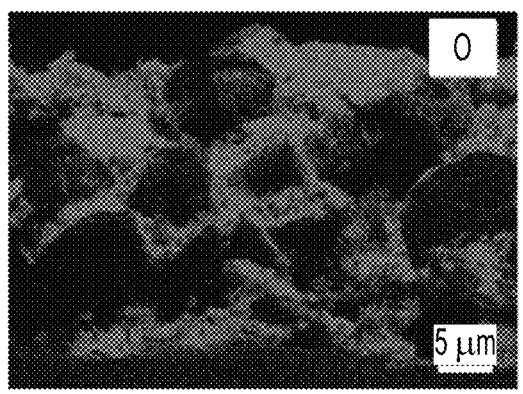
Figure 6D:
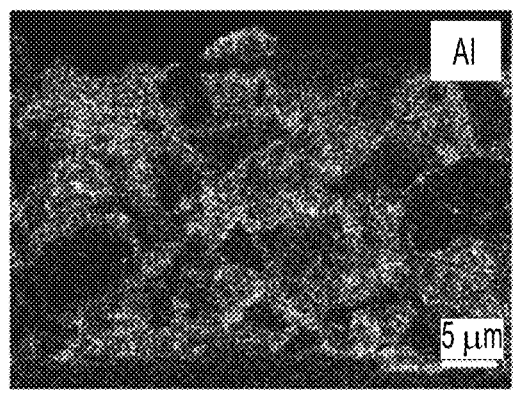
Figure 6C:
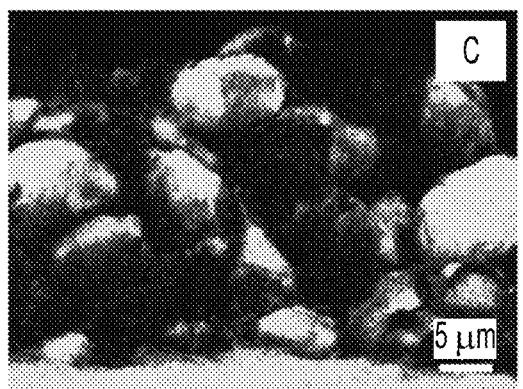
Figure 6E:
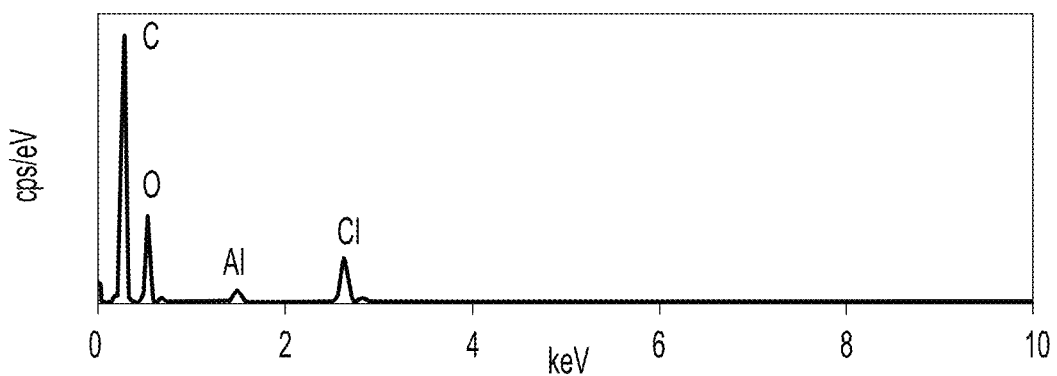

FIGS. 6A-6E illustrate EDS mappings of individual elements of the graphite electrode in FIGS. 3C-3D. In particular, EDS mappings of Cl (FIG. 6A), O (FIG. 6B), Al (FIG. 6C), C (FIG. 6D) of the electrode in FIGS. 3C-3D, and FIG. 6E illustrates EDS spectrum of the electrode in FIGS. 3C-3D.

Figure 7A:
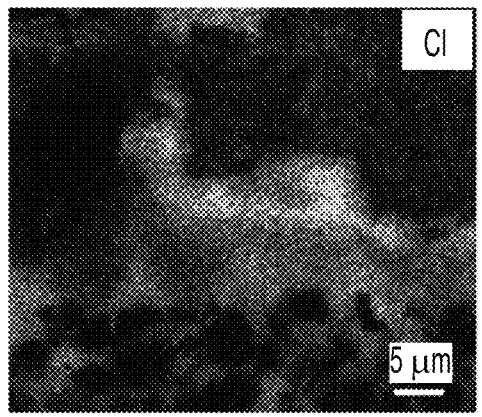
FIGS. 7A-7E illustrate EDS mappings of individual elements of NCM$^{111}$-LTO full cell in FIGS. 3G-3H.
Figure 7B:
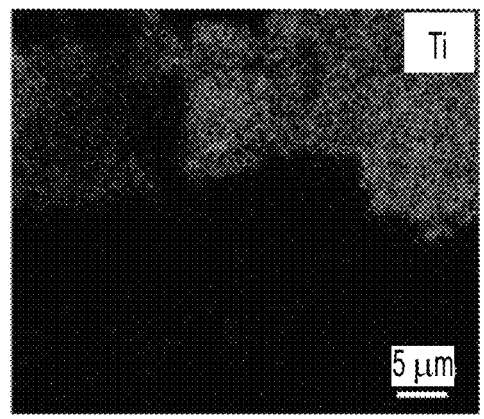
Figure 7C:
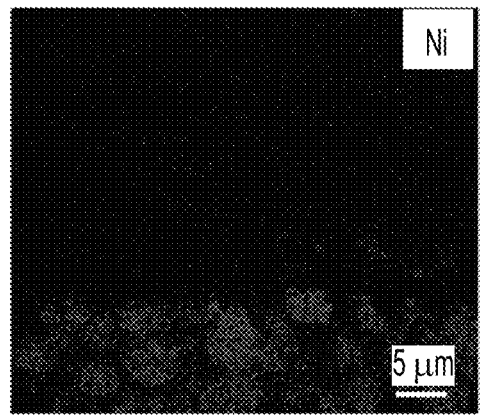
Figure 7D:
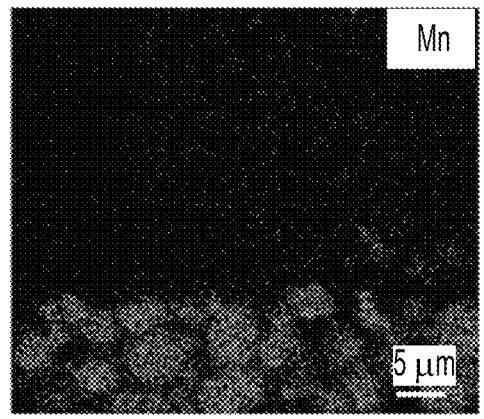
Figure 7E:
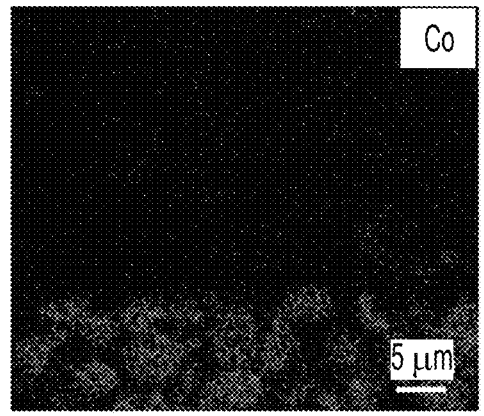

FIGS. 7A-7E illustrate EDS mappings of individual elements of NCM$^{111}$-LTO full cell in FIGS. 3G-3H. In particular, EDS mappings of Cl (FIG. 7A), Ti (FIG. 7B), Ni (FIG. 7C), Mn (FIG. 7D) of the electrode in FIGS. 3G-3H, and FIG. 7E illustrates EDS spectrum of the electrode in FIGS. 3G-3H.

The scanning electron microscopy (SEM) as well as energy dispersive spectroscopy (EDS) line scan and mapping analyses of the cross-sections of the NCM$^{111}$ (e.g., see FIGS. 3A-3B and FIGS. 4A-4E), graphite (e.g., see FIGS. 3C-3D and FIGS. 6A-6E) and LTO (e.g., see FIGS. 3E-3F and FIGS. 5A-5E) electrodes reveal complete infiltration of the SSE (green line) within the porous structure of the electrodes (NCM$^{111}$-purple line, LTO-red line, graphite-blue line) down to the current collector, proving effectiveness of the exemplary melt-infiltration technology described herein. FIGS. 3G-3H shows a cross-section SEM and an EDS map of the example unit NCM/SSE/LTO stack with the melt-infiltrated SSE, while FIGS. 3I-3K demonstrate high-resolution SEM micrographs and high-resolution EDS maps demonstrating a perfect wetting with a sharp interface between active materials and the SSE. In some designs, the amount of the SSE dry cast on the surface of the electrode can be controlled precisely so that the thickness of the SSE remaining on the top surface of the electrode after melt-infiltration can be tailored to a small (e.g., about 5-25 µm) thickness (e.g., average thickness). In some designs, the electrodes could also be coated with thermally stable ceramic particles to provide uniform separation for multi-layered cylindrical or pouch cells. In some designs, to improve wetting of the molten SSE on the surface of carbon black additives and the polymer binder, the electrodes may be coated by about 40 nm of $Al_2O_3$ (e.g., see FIG. 3K and Working Example below). As shown in FIGS. 3I-3J, wetting of $NCM^{111}$ and LTO particles by the molten $Li_{1.9}OHCl_{0.9}$ SSE is outstanding without any surface modifications with $Al_2O_3$. Such a perfect wetting facilitates reduced interfacial impedance at the particle-SSE interface. As a result, the rate performance of the melt-infiltrated electrodes was only hindered by the ionic conductivity of the SSE and not by the interfacial impedance.

FIGS. 8A-8L illustrate microstructural and thermal characterization of the SSE and the electrode materials before and after the melt-infiltration in accordance with an embodiment of the disclosure. FIG. 8A illustrates an XRD spectrum of the SSE powder before melt-infiltration. FIG. 8B illustrates an XRD spectrum of the $NCM^{111}$ powder before the melt-infiltration. FIG. 8C illustrates an XRD spectrum of the $NCM^{111}$-SSE powder after the melt-infiltration showing no changes in crystallinity and no detected impurities. FIG. 8D illustrates an XRD spectrum of the LTO powder before the melt-infiltration. FIG. 8E illustrates an XRD spectrum of the LTO-SSE powder after the melt-infiltration showing no changes of crystallinity and no detected impurities. FIG. 8F illustrates a differential scanning calorimetry (DSC) profile of the SSE powder. FIG. 8G illustrates a DSC profile of the $NCM^{111}$ electrode. FIG. 8H illustrates a DSC profile of the in-situ melt-infiltration of the SSE into the $NCM^{111}$ electrode. FIG. 8I illustrates a DSC of the LTO electrode. FIG. 8J illustrates a DSC profile of the in-situ melt-infiltration of the SSE into the LTO electrode. FIG. 8K illustrates a DSC profile of the graphite electrode. FIG. 8L illustrates a DSC of the in-situ melt-infiltration of the SSE into the graphite electrode.

No changes in crystallinity or the appearance of new phases either for the active materials particles or the SSE took place after the melt-infiltration and heating about 40° C. above the employed heating temperature (e.g., about 300° C.), as evidenced by the XRD spectra in FIGS. 8A-8E. DSC profiles of the electrodes, the SSE and the SSE-infiltrated electrodes during heating to about 340° C. (e.g., FIGS. 8F-8L) show no heat release or consumption apart from the peaks related to melting or solidification of the SSE. This strongly suggests that such relatively low-temperature melt-infiltration conditions do not affect the chemical properties of the electrode components and do not induce undesirable side reactions between the SSE and electrode materials.

All-solid-state $NCM^{111}$, LTO and graphite electrodes prepared by the melt-infiltration technology were tested first with the Li-metal counter electrode in half cells. FIGS. 9A-9F illustrate the electrochemical performance of $NCM^{111}$-Li, LTO-Li and graphite-Li half cells with the electrodes filled with the SSE by using the melt-infiltration technology. In particular, the respective cells were cycled at about 60° C. FIG. 9A illustrates discharge capacity (red dots) and Coulombic efficiency (blue circles) of the $NCM^{111}$ cycled at 14 mA $g^{-1}$. FIG. 9B illustrates a voltage profile of the $NCM^{111}$ cycled at 14 mA $g^{-1}$. FIG. 9C illustrates discharge capacity (red dots) and Coulombic efficiency (blue circles) of the LTO cycled at 28 mA $g^{-1}$. FIG. 9D illustrates a voltage profile of the LTO cycled at 28 mA $g^{-1}$. FIG. 9E illustrates discharge capacity (red dots) and Coulombic efficiency (blue circles) of the graphite cycled at 28 mA $g^{-1}$. FIG. 9F illustrates a voltage profile of the graphite cycled at 28 mA $g^{-1}$.

FIGS. 10A-10F illustrate electrochemical performance of $NCM^{111}$-Li, LTO-Li, graphite-Li half cells with a conventional liquid electrolyte (1M $LiPF_6$ in EC/DEC). The respective cells in FIGS. 10A-10F were cycled at 25° C. FIG. 10A illustrates discharge capacity (red dots) and Coulombic efficiency (blue circles) of the $NCM^{111}$ cycled in a liquid electrolyte at 28 mA $g^{-1}$. FIG. 10B illustrates a voltage profile of the $NCM^{111}$ cycled in a liquid electrolyte at 28 mA $g^{-1}$. FIG. 10C illustrates discharge capacity (red dots) and Coulombic efficiency (blue circles) of the LTO cycled in a liquid electrolyte at 28 mA $g^{-1}$. FIG. 10D illustrates a voltage profile of the LTO cycled in a liquid electrolyte at 28 mA $g^{-1}$. FIG. 10E illustrates discharge capacity (red dots) and Coulombic efficiency (blue circles) of the graphite cycled in a liquid electrolyte at 28 mA $g^{-1}$. FIG. 10F illustrates a voltage profile of the graphite cycled in a liquid electrolyte at 28 mA $g^{-1}$. As shown in FIGS. 10A-10F, $NCM^{111}$-Li, LTO-Li, and graphite-Li cells showed similar voltage profiles and similar (slightly smaller) capacities to those in the corresponding organic electrolyte cells.

To properly evaluate the melt-infiltration technique, ASSLBs were constructed from $NCM^{111}$ cathodes (e.g., FIGS. 10A-10B) and LTO anodes (e.g., FIGS. 10C-10D) each melt-infiltrated with the SSE (see Working Example below and FIGS. 3G-3H) and tested their performance at about 100° C. and about 60° C., as described below with respect to FIGS. 11A-11I.

In some designs, a thermally stable porous separator melt-infiltrated with SSE may be advantageously used. Examples of materials used in such separators include, but are not limited to $Al_2O_3$, AlFO (or, more broadly, $AlF_xO_y$, where 2y+1x=3), AlO(OH), $Al(OH)_3$, $LiAlO_2$, $LiAl_5O_8$, MgO, $MgF_{x1}O_{y1}$ where $2y_1+1x_1+=2$, ZrO, $ZrF_{x1}O_{y1}$ where $2y_1+1x_1=2$, other metal oxides and oxyfluorides, thermally stable polymers coated or polymers coated with or infiltrated with ceramic, their various mixtures and combinations. in some designs, materials in such thermally stable separators may be in the form of linked particles or nanoparticles, fibers and nanofibers, nanowires, and whiskers, nanoflakes, nanoplatelets, platelets, nonwoven, and others.

Figure 11A:
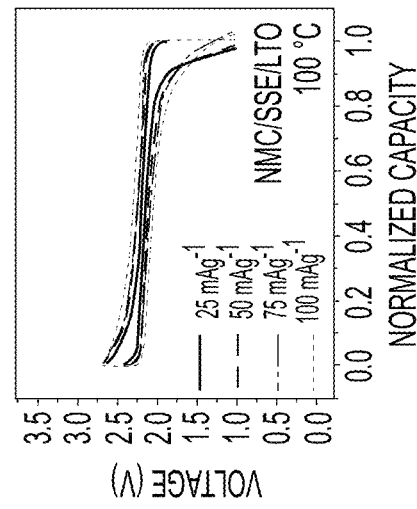
Figure 11B:
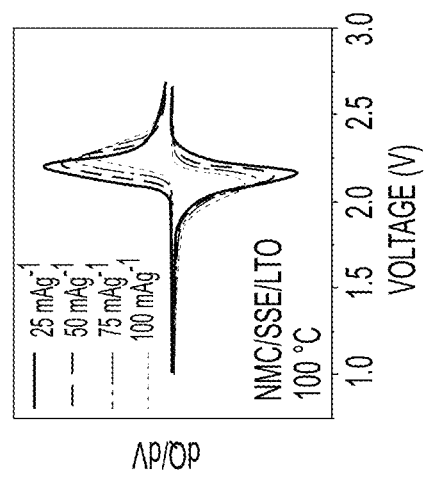
Figure 11C:
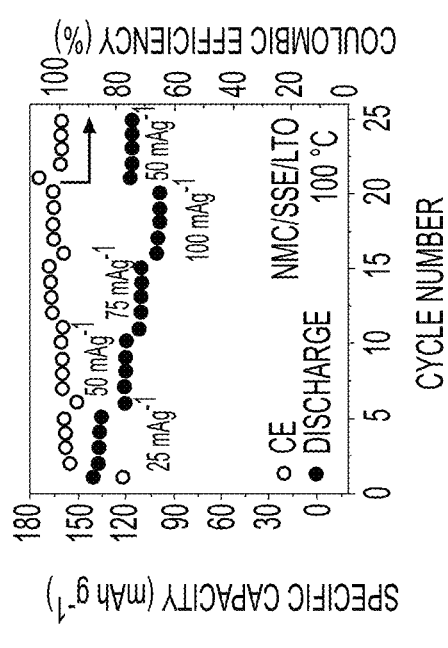
Figure 11D:
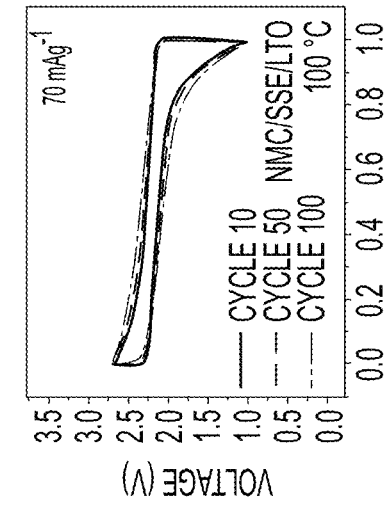
Figure 11E:
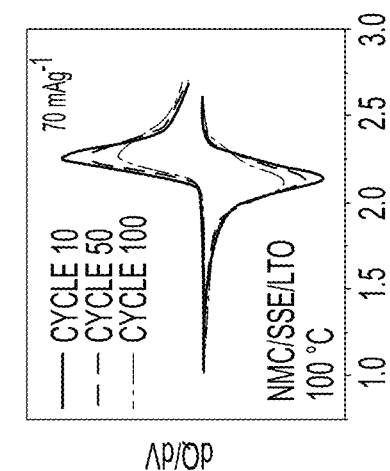
Figure 11F:
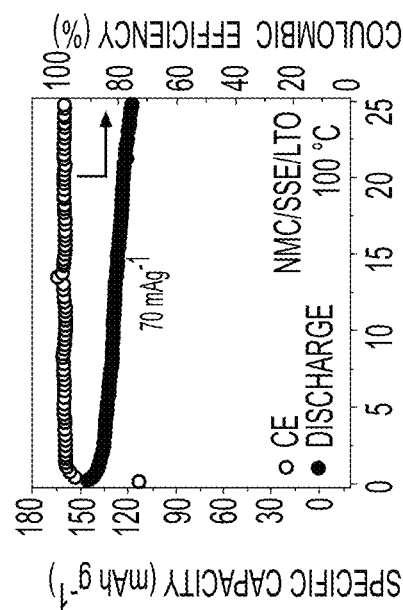

FIGS. 11A-11I illustrate electrochemical performance of $NCM^{111}$-LTO ASSLBs fabricated by melt-infiltration technology in accordance with an embodiment of the disclosure. Cells in FIGS. 11A-11F were cycled at about 100° C. in the potential window of about 1.0-2.7V, and cell in FIGS. 11G-11I was cycled at about 60° C. in the potential window of about 1.5-2.8V. FIG. 11A illustrates discharge capacity normalized by the cathode mass (red dots) and Coulombic efficiency (blue circles) of the ASSLB cycled at about 25, 50, 75, 100 mA $g^{-1}$ (normalized by the cathode mass) current rates at 100° C. FIG. 11B illustrates differential capacity curves of the ASSLB cycled at about 25, 50, 75, 100 mA $g^{-1}$ current rates. FIG. 11C illustrates a voltage profile of the ASSLIB cycled at about 25, 50, 75, 100 mA $g^{-1}$ current rates. FIG. 11D illustrates discharge capacity (red dots), and Coulombic efficiency (blue circles) of the ASSLB cycled at about 70 $mAg^{-1}$. FIG. 11E differential capacity curves of the ASSLB cycled at about 70 mA $g^{-1}$. f, voltage profile of the SSLIB cycled at about 70 $mAg^{-1}$. FIG. 11G illustrates discharge capacity (red dots) and Coulombic efficiency (blue circles) of an ASSLB cycled at different C-rates at about 60° C. FIG. 11H illustrates discharge capacity (red dots) and Coulombic efficiency (blue circles) of an ASSLB cycled at about 28 $mAg^{-1}$. FIG. 11I illustrates a voltage profile of the ASSLB cycled at about 28 $mAg^{-1}$. Not a single drop of a liquid or gel electrolyte was utilized in any stages of the full cell preparation associated with any of FIGS. 11A-11I, in contrast to the majority of other ASSLB studies reported.

Referring to FIGS. 11A-11F, the charge-discharge tests conducted at about 100° C. and current density of about 25-100 mA g$^{-1}$ showed low interfacial resistance and excellent cell stability and reversibility of redox reactions in an NCM$^{111}$/LTO full cell cycled in a 1.0-2.8 V range (e.g., see FIGS. 11A-11B). FIG. 11C shows small voltage hysteresis values (e.g., about 0.1 V at about 25 mA g$^{-1}$), which slightly increases with increasing current density due to the additional ohmic voltage drop. At the current rate of about 70 mA g$^{-1}$, the cell demonstrated excellent reversibility (e.g., FIG. 11E) and delivered a capacity of about 150 mAh/g (e.g., FIG. 11D) with the capacity retention of over about 80% after 100 cycles. The hysteresis voltage did not significantly change after 100 cycles (e.g., FIG. 11F). At a reduced temperature of about 60° C., the NCM$^{111}$/LTO full cell still showed good C-rate performance (e.g., FIG. 11G) and stable cycling at about 28 mA g$^{-1}$ (e.g., FIG. 11H) with similar capacity retention and no significant changes of shape and size of the voltage hysteresis during the cycling (e.g., FIG. 11I).

Figure 12A:
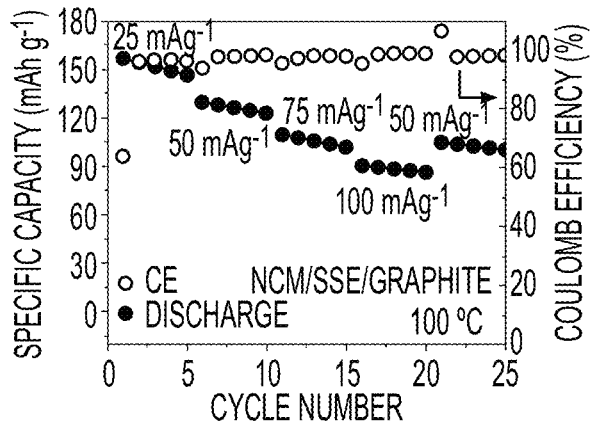
FIGS. 12A-12F illustrate electrochemical performance of NCM$^{111}$-graphite ASSLBs fabricated by melt-infiltration technology in accordance with an embodiment of the disclosure.
Figure 12B:
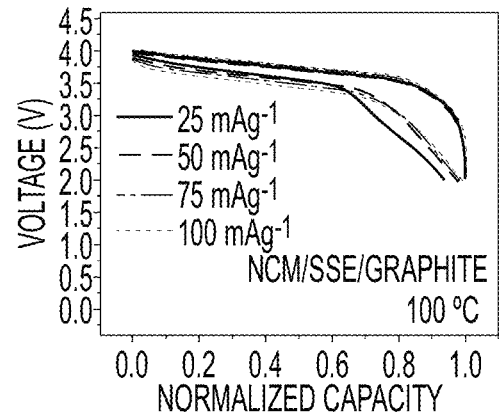
Figure 12C:
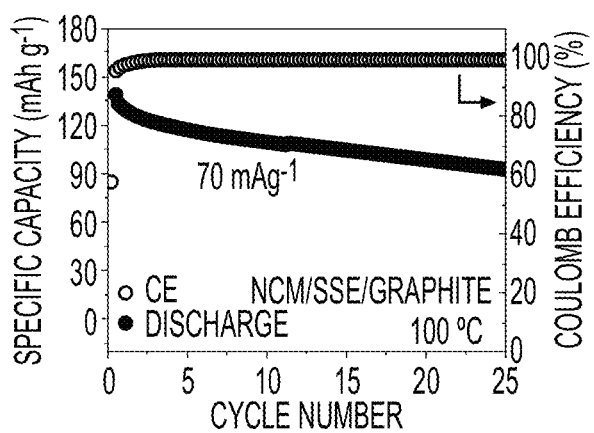
Figure 12D:
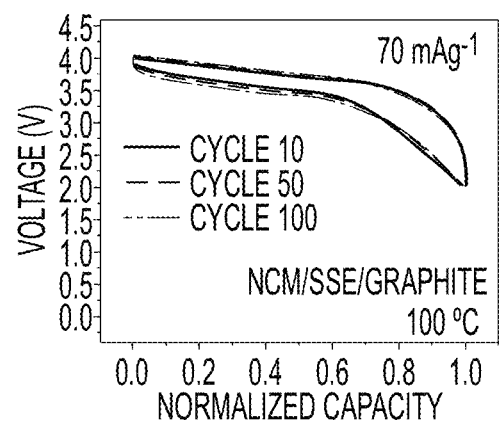
Figure 12E:
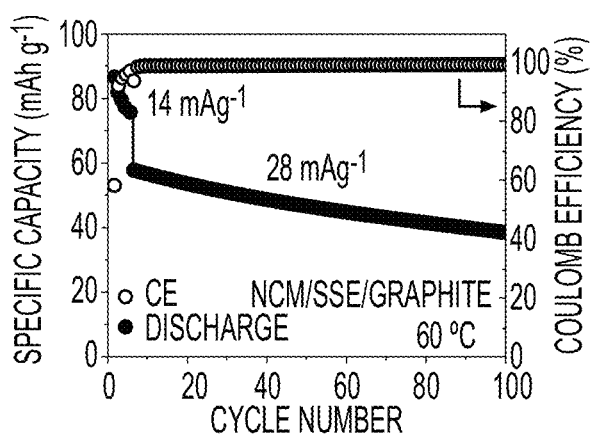
Figure 12F:
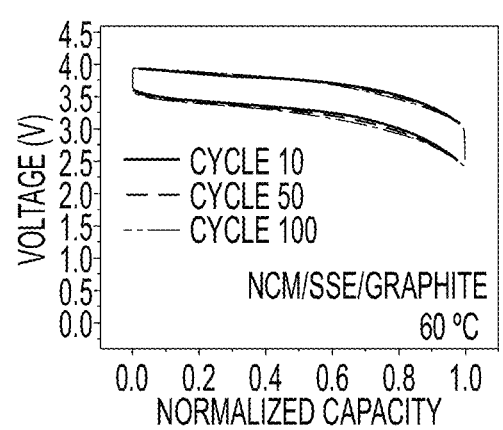

In addition to NCM$^{111}$/LTO cells, all-solid-state NCM$^{111}$/graphite full cells were manufactured from the corresponding melt-infiltrated electrodes. FIGS. 12A-12F illustrate electrochemical performance of NCM$^{111}$-graphite ASSLBs fabricated by melt-infiltration technology in accordance with an embodiment of the disclosure. Cells in FIGS. 12A-12D were cycled at about 100° C. in the potential window of about 2.0-4.0V, and the cell in FIGS. 11E-11F was cycled at about 60° C. in the potential window of about 2.5-4.0V. FIG. 12A illustrates discharge capacity normalized by the cathode mass (red dots) and Coulombic efficiency (blue circles) of the ASSLB cycled at about 25, 50, 75, 100 mA g$^{-1}$ (normalized by the cathode mass) current rates at about 100° C. FIG. 12B illustrates a voltage profile of the ASSLB cycled at about 25, 50, 75, 100 mA g$^{-1}$ current rates. FIG. 12C illustrates discharge capacity (red dots), and Coulombic efficiency (blue circles) of the ASSLB cycled at about 70 mAg$^{-1}$. FIG. 12D illustrates a voltage profile of the ASSLB cycled at about 70 mAg$^{-1}$. FIG. 12E illustrates discharge capacity (red dots) and Coulombic efficiency (blue circles) of an ASSLB cycled at about 14 and about 28 mA g$^{-1}$ current rates at about 60° C. FIG. 12F illustrates a voltage profile of the ASSLB cycled at about 28 mA g$^{-1}$.

FIGS. 12A-12B show cell rate performance and reversibility of redox reactions in an NCM$^{111}$/graphite full cell cycled from about 2.0V to about 4.0V. Initial NCM$^{111}$ capacity of about 155 mAh g$^{-1}$ at 25 mA g$^{-1}$ decreased to about 95 mAh g$^{-1}$ at about 100 mA g$^{-1}$, respectively, and then returned to about 110 mAh g$^{-1}$ at about 50 mA g$^{-1}$ (e.g., FIG. 12A). The capacity retention was about 75% after about 100 cycles (e.g., FIG. 12C) in the full cell cycled from about 2.0V to about 4.0V at about 25 mA g$^{-1}$. The voltage hysteresis did not change significantly after about 100 cycles at about 100° C. (e.g., FIG. 12D). At about 60° C., the NCM$^{111}$/graphite full cell showed similar cycle stability at about 28 mA g$^{-1}$ after the C-rate test (e.g., FIG. 12E) with no significant change of shape and size of the voltage hysteresis during the cycling (e.g., FIG. 12F). Both results demonstrate cycling stability and overall performance comparable to that of the identical electrodes in liquid electrolytes (e.g., see FIG. 10F).

Figure 13A:
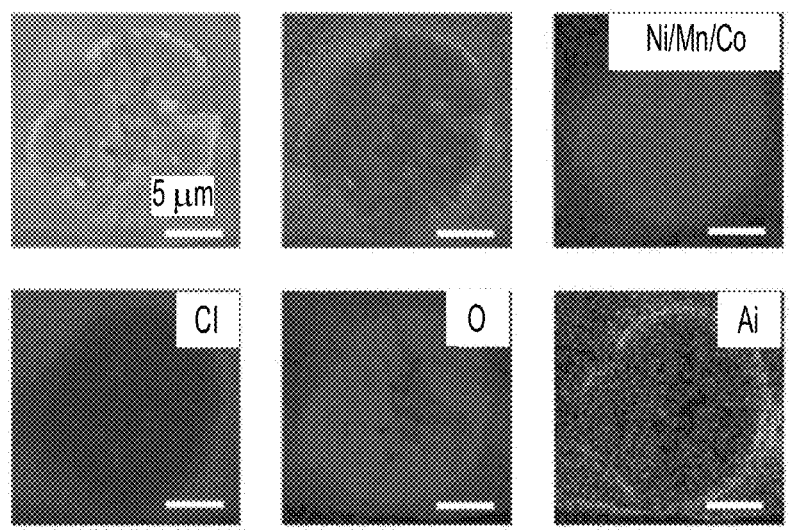
FIG. 13A illustrates an SEM-EDS of the melt-infiltrated NCM$^{111}$ electrode after about 100 cycles at about 70 mAg$^{-1}$ at about 100° C. in the NCM$^{111}$-graphite cell in accordance with an embodiment of the disclosure.
Figure 13B:
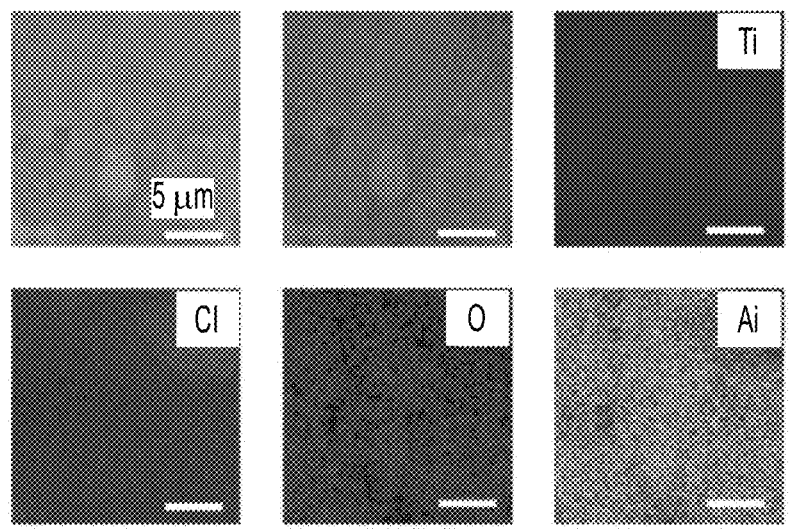
FIG. 13B illustrates an SEM-EDS of the melt-infiltrated LTO electrode after about 100 cycles at about 70 mAg$^{-1}$ at about 100° C. in the NCM$^{111}$-LTO cell in accordance with an embodiment of the disclosure.
Figure 13C:
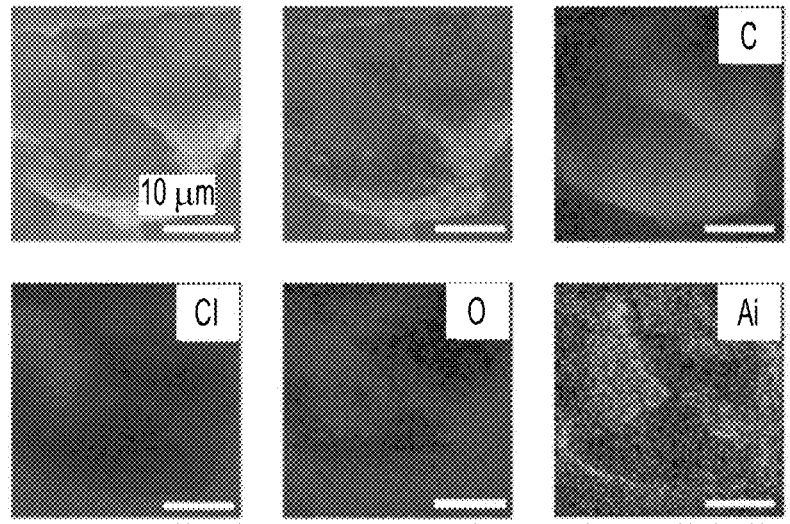
FIG. 13C illustrates an SEM-EDS of the melt-infiltrated graphite electrode after about 100 cycles at about 70 mAg$^{-1}$ at about 100° C. in the NCM$^{111}$-graphite cell in accordance with an embodiment of the disclosure.

FIG. 13A illustrates an SEM-EDS of the melt-infiltrated NCM$^{111}$ electrode after about 100 cycles at about 70 mAg$^{-1}$ at about 100° C. in the NCM$^{111}$-graphite cell. FIG. 13B illustrates an SEM-EDS of the melt-infiltrated LTO electrode after about 100 cycles at about 70 mAg$^{-1}$ at about 100° C. in the NCM$^{111}$-LTO cell. FIG. 13C illustrates an SEM-EDS of the melt-infiltrated graphite electrode after about 100 cycles at about 70 mAg$^{-1}$ at about 100° C. in the NCM$^{111}$-graphite cell.

In some applications, volume changes in active materials induce significant interface stresses in ASSLB cells. Some of the capacity decay observed in the tested cells as shown in FIGS. 11A-12F may be a result of such volume change-based interface stresses. However, in some designs, the active material composition may be tuned so as to reduce or minimize such volume changes (e.g., keep them below around 6 vol. %, in some designs below around 3 vol. %, in some designs below around 1 vol. %), further improving the interface and attaining industry-level uniformity in the electrode fabrication and melt-infiltration. The unique ability of the disclosed melt-infiltration technology to achieve very dense packing of the active cathode and anode particles in the inorganic all-solid electrodes in combination with its simplicity and compatibility with the current commercial Li-ion cell fabrication technique should stimulate further explorations of low melting point inorganic electrolytes and accelerate the adoption of commercially viable solid-state batteries.

In some designs, it may be advantageous to tune the SSE composition to reduce its melting point below about 350° C. In some designs, it may be even more advantageous to tune the SSE composition to reduce its melting point below about 300° C. In some designs, it may be even more advantageous to tune the SSE composition to reduce its melting point below about 250° C. In some designs, it may be even more advantageous to tune the SSE composition to reduce its melting point below about 200° C.

In some designs, small amounts of inorganic solvents (e.g., sulfur dioxide, sulfuryl chloride fluoride, dinitrogen tetroxide, etc.) may be added into the SSE(s) in order to reduce their melting points or enhance their conductivity. Accordingly, the inorganic solvent content can be one example mechanism by which the melting point of the SSE composition can be tuned as noted above (e.g., which may be used alone or in conjunction with other melting point tuning mechanisms).

In some designs, thermally stable ionic liquids may be added into the SSE(s) in order to reduce their melting points or enhance their conductivity. Accordingly, the thermally stable ionic liquid content is another example mechanism by which the melting point of the SSE composition can be tuned as noted above (e.g., which may be used alone or in conjunction with other melting point tuning mechanisms). Illustrative examples of suitable ionic liquids include, but are not limited to: 1-butyl 3-methylimidazolium tetrafluoroborate, 1-ethyl 3-methylimidazolium tetrafluoroborate, 1-hexyl 3-methylimidazolium tetrafluoroborate, 1-butyl 2-methyl 3-methylimidazolium hexafluorophosphate, 1-butyl 2-methyl 3-methylimidazolium tetrafluoroborate, 1-methyl 2-methylimidazolium bis(trifluromethylsulfonyl)imide, 1-butyl 3-methylimidazolium bis(trifluromethylsulfonyl)imide or other imidazolium-cation based ionic liquids and their various mixtures or derivatives.

In some designs, SSE compositions may comprise a meaningful amount (e.g., in excess of about 5 at. %; in some designs, in excess of about 10 at. %; in some designs, in excess of about 20 at. %) of Li in its composition.

In some designs, SSE compositions may comprise a meaningful amount (e.g., in excess of about 0.5 at. %; in some designs, in excess of about 5 at. %; in some designs, in excess of about 10 at. %) of one, two or more different halogen atoms: Cl, F, Br, or I.

In some designs, SSE compositions may comprise a meaningful amount (e.g., in excess of about 0.5 at. %; in some designs, in excess of about 1 at. %; in some designs, in excess of about 1 at. %) of one, two or more of chalcogens or group 5 elements: O, S, Se, N, P, As.

In some designs, SSE compositions may comprise a meaningful amount (e.g., in excess of about 0.5 at. %; in some designs, in excess of about 2 at. %; in some designs, in excess of about 5 at. %; in some designs, in excess of about 10 at. %) of one, two or more suitable metals from the groups 1, 2 or 3, such as: H, Li, Na, K, Cs, Fr, Be, Mg, Ca, Sr, Ba, Sc, Y, La (or non-La lanthanoids), B, and Al, among others. Note that each of such metals may be used in different atomic fractions or not used at all.

In some designs, SSE compositions may comprise a meaningful amount (e.g., in excess of about 0.5 at. %; in some designs, in excess of about 2 at. %) of one, two or more suitable metals from the group of: Ta, Zr, Hf, Nb.

In some designs, it may be advantageous for the solid-state Li or Li-ion cells (e.g., the anode electrode, the cathode electrode, etc.) to exhibit areal electrode capacity loadings of more than about 2 mAh/cm$^2$. In some designs, it may be advantageous for the solid-state Li or Li-ion cells to exhibit areal electrode capacity loadings in excess of about 3 mAh/cm$^2$. In some designs, it may be advantageous for the solid-state Li or Li-ion cells to exhibit areal electrode capacity loadings in excess of about 4 mAh/cm$^2$. In some designs, it may be advantageous for the solid-state Li or Li-ion cells to exhibit areal electrode capacity loadings in excess of about 5 mAh/cm$^2$. In some designs, it may be advantageous for the solid-state Li or Li-ion cells to exhibit areal electrode capacity loadings in excess of about 6 mAh/cm$^2$. In some designs, it may be advantageous for the solid-state Li or Li-ion cells to exhibit areal electrode capacity loadings more than about 7 mAh/cm$^2$.

In some designs, the cathode electrode may comprise nickel (Ni). In some designs, an atomic fraction of Ni in a composition of the cathode active material is more than about 80 at. %, relative to all transition metals in the cathode active material.

In some designs, it may be advantageous for the fabrication of solid-state Li or Li-ion cells to heat such cells at or above the melt-infiltration temperature in vacuum prior and during electrolyte infiltration. In some designs, it may be advantageous to melt-infiltrate SSE into such cells under reduced pressure (vacuum) in order to greatly minimize and ideally completely avoid undesirable gas bubbles (or unfilled by electrolyte areas) within the electrode and to improve/accelerate melt-electrolyte infiltration. In some designs, it may be advantageous for the dry cell pressure during the SSE melt infiltration procedure to be below about 0.2 atm. In some designs, it may be advantageous for the dry cell pressure during the SSE melt infiltration procedure to be below about 0.1 atm. In some designs, it may be advantageous for the dry cell pressure during the SSE melt infiltration procedure to be below about 0.01 atm. In some designs, it may be advantageous for the dry cell pressure during the SSE melt infiltration procedure to be below about 0.001 atm.

In some designs, conducting the first charge or the first discharge or first charge-discharge cycle(s) in the melt-infiltrated solid-state Li or Li-ion cells at elevated temperatures (where SSE is either soft or molten) may be advantageous in terms of releasing some of the mechanical stresses, releasing some of the possible gasses and/or ensuring improved capacity utilization, improved cycle stability and improved rate performance of the SSE Li or Li-ion cells with the melt-infiltrated electrolyte. In some designs, it may be advantageous for the melt-infiltrated solid-state Li or Li-ion cells to undergo the first charge or the first discharge or first charge-discharge cycle(s) at above about ⅔ of the melting point of the SSE (in K). In this case the stresses (and the remaining strain or various cracks or defects, as could be detected by X-ray diffraction or Raman spectroscopy or electron microscopy techniques or other methods) originating from the volume expansion in the electrode materials may be significantly minimized. In some designs, it may be advantageous for the melt-infiltrated solid-state Li or Li-ion cells to undergo the first charge or the first discharge or first charge-discharge cycle(s) at or above the melting point of the SSE in order to further reduce such stresses and detectable defects and strain and improve stability and performance of cells. In some designs, it may be advantageous for the melt-infiltrated solid-state Li or Li-ion cells to undergo the first charge and first discharge or first charge-discharge cycle(s) at or above the melting point of the SSE.

In some designs, it may be advantageous for the fabrication of solid-state Li or Li-ion cells to have mechanically constrained (or compressed) dry cells prior to melt-infiltration with the SSE (e.g., to reduce or avoid cell expansion while the SSE is being melt-infiltrated). In this case, the electrode expansion and the related reduction in volumetric capacity during the melt-infiltration may be minimized or avoided.

In some designs, it may be advantageous for the melt-infiltrated solid-state Li or Li-ion cells to comprise a meaningful amount of conductive (e.g., sp$^2$-bonded) carbon in its fully charged anodes (e.g., above about 5 wt. % relative to the total mass of Li, active material(s), binder and conductive additives, but not including the mass of the current collector). For example, the anode electrode may comprise conductive sp2-bonded carbon in some designs.

Working Example

Synthesis of Solid-State Electrolytes:

All the procedures were conducted inside an Ar-filled glovebox. The starting materials used for the synthesis of $Li_{1.9}OHCl_{0.9}$ were LiOH (anhydrous, 98%, Alfa) and LiCl (anhydrous, 99%, Alfa). Both precursors were dried at 100° C. for 24 hours before each experiment. LiOH and LiCl in the molar ratio of 10:9 were ground and mixed. They were then heated to 650° C. at a heating rate of 400° C. min' inside a graphite crucible with an induction heater. The molten sample inside the crucible was naturally cooled until 550° C. and then poured onto a graphite plate for fast cooling. The obtained solid-state electrolytes were ground into powder for characterizations and the melt-infiltration process.

Preparation of Electrodes:

$LiNi_{0.33}Mn_{0.33}Co_{0.33}O_2$ (NCM$^{111}$), $Li_4Ti_5O_{12}$ (LTO), graphite, carbon black (CB), polyvinylidene fluoride (PVDF), polyamideimide (PAI), and N-methyl-2-pyrrolidone (NMP) were used. Slurries were prepared by mixing the active materials with carbon black, PVDF, and PAI in NMP and then cast onto current collectors with a Dr. Blade to fabricate the electrode. Provided high-temperature conditions for melt-infiltration (~300° C.), we used a mixture of the traditional poly(vinylenedifluoride) (PVDF) with a thermally stable polyamideimide (PAI) as a blended binder, which enables the necessary toughness, high thermal and chemical resistance and dimensional stability, which is achievable due to the intermolecular hydrogen bonding between highly polarized $CH_2$ groups of PVDF and the C=O groups of PAI[35]. For $NCM^{111}$ cathodes, the wt. % ratio were $NCM^{111}$:CB:PVDF:PAI=95:1:2:2 and the current collectors were graphite foils. For LTO anodes, the wt. % ratio were LTO:CB:PVDF:PAI=91:1:4:4 and the current collectors were graphite foils. For graphite anodes, the wt. % ratio were graphite:CB:PVDF:PAI=91:1:4:4 and the current collectors were Cu foils. All electrodes were dried at 80° C. for 12 hours after casting. $ZrO_2/Al_2O_3$ coatings were deposited onto the electrodes by atomic layer deposition (ALD) (using Fiji F202, Cambridge NanoTech) at 200° C. for ~200 cycles. The electrodes were punched into discs with 12.8 mm in diameter for the melt-infiltration process. In some designs, one, two or more poly(ether)imide(s) (PEI), polyether ether ketone (PEEK), or aromatic polyamides or other thermally stable polymers (e.g., thermoplastic polymers with a melting point in excess of about 250° C.) may be used as a binder (or a component of a binder) instead of or in addition to PAI for the preparation of thermally stable anodes or cathodes for use in the SSE melt-infiltration procedures.

Melt-Infiltration Process:

An induction heating device was used for the melt-infiltration technique due to its ultra-fast heating rate (>400° C. $min^{-1}$) that minimized the processing time. A graphite rod (diameter 25.6 mm; height 30 mm) was used as the heating element. Prior to the melt-infiltration process, an electrode disc was placed on the top of the heating element. 3-5 mg of SSE powder was uniformly dispersed onto the top surface of the electrode by dry casting. The electrode was then heated until the SSE powder was fully molten. By the capillary effect, the molten SSE was infiltrated into the electrodes and filled the pores in the electrodes. After melt-infiltration, the electrode was naturally cooled down to room temperature.

Fabrication of Half Cells:

A poly(ethylene oxide) (PEO)-bis(trifluoromethane) sulfonimide lithium salt (LiTFSI) polymer electrolyte (PE) membrane was placed between a melt-infiltrated electrode and a Li-metal anode to attain a good contact with a Li metal anode.

Fabrication of all-Solid-State Li-Ion Cells:

A melt-infiltrated cathode ($NCM^{111}$) and a melt-infiltrated anode (LTO, graphite) were separately prepared by melt-infiltration. A 13 mm diameter heated die (Across International) was used. The melt-infiltrated cathode and the melt-infiltrated anode were loaded into the die and were hot-pressed together at 200° C. for 1 hour at a pressure of 80 MPa. After cooling down, the full cell pellet was sealed in a CR2032 coin cell for electrochemical measurements.

Characterizations:

Scanning electron microscopy (SEM) (SU8230, Hitachi) was used to examine the cross-sections of the electrodes after melt-infiltration. The elemental distribution was obtained by energy dispersive spectrometer (EDS) mapping. Transmission electrode microscopy (TEM) (FEI Tecnai G2 F30) was used to examine the interface between NCM and SSE after melt-infiltration and EDS was detected under STEM mode. X-Ray Diffraction (XRD) (Alpha-1, PANalytical) was used to characterize phases in the SSE, as well as the mixtures of SSE and active materials ($NCM^{111}$, LTO). All the powder samples were sealed by Kapton tape to prevent hydrolysis during XRD measurement. Differential scanning calorimetry (DSC) (Q600 SDT, TA Instrument) was performed to detect the melting point of the SSE, as well as the thermal stability of the electrodes. The temperature range was 200-350° C. with a ramp rate of 5° C.

Electrochemical Measurements:

Electrochemical impedance spectroscopy (EIS) was used to measure the ionic conductivity of the SSE in symmetric cells. SSE powder was pressed into pellets (diameter 13 mm; thickness <1 mm) at room temperature with a pressing die at a pressure of 800 MPa. Then the pellets were sandwiched by two identical current collectors (stainless steel or graphite) and hot-pressed at 200° C. for 1 hour. CR2032 coin cells were fabricated for electrochemical impedance spectroscopy measurements (Reference 600tm, Gamry Instruments), which were taken in the frequency range of 1 MHz to 1 Hz at various temperatures (25, 30, 40, 50, 60, 70, 80, 90, 100, and 110° C.). Charge-discharge tests of the solid-state Li-ion cells were conducted on a multichannel Arbin Potentiostat (Arbin Instruments, USA) at 100 or 60° C. with various current rates. The cycling voltage ranges for the melt-infiltrated $NCM^{111}$/PE/Li cells, LTO/PE/Li cells, and graphite/PE/Li cells were 2.5-4.2 V, 1-2.5 V, and 0-2 V, respectively. The voltage ranges for the melt-infiltrated $NCM^{111}$-LTO cells were 1.0-2.8 V. The voltage ranges for $NCM^{111}$-graphite cells were 2.0-4.0 V. Li-metal coin cells with organic electrolyte (1M $LiPF_6$ in EC/DEC) and polymer separator (Celgard 2400) were also made for the $NCM^{111}$, LTO, and graphite electrodes (without melt-infiltration) to study their capacities in conventional Li-ion batteries at 25° C.

Figure 14:
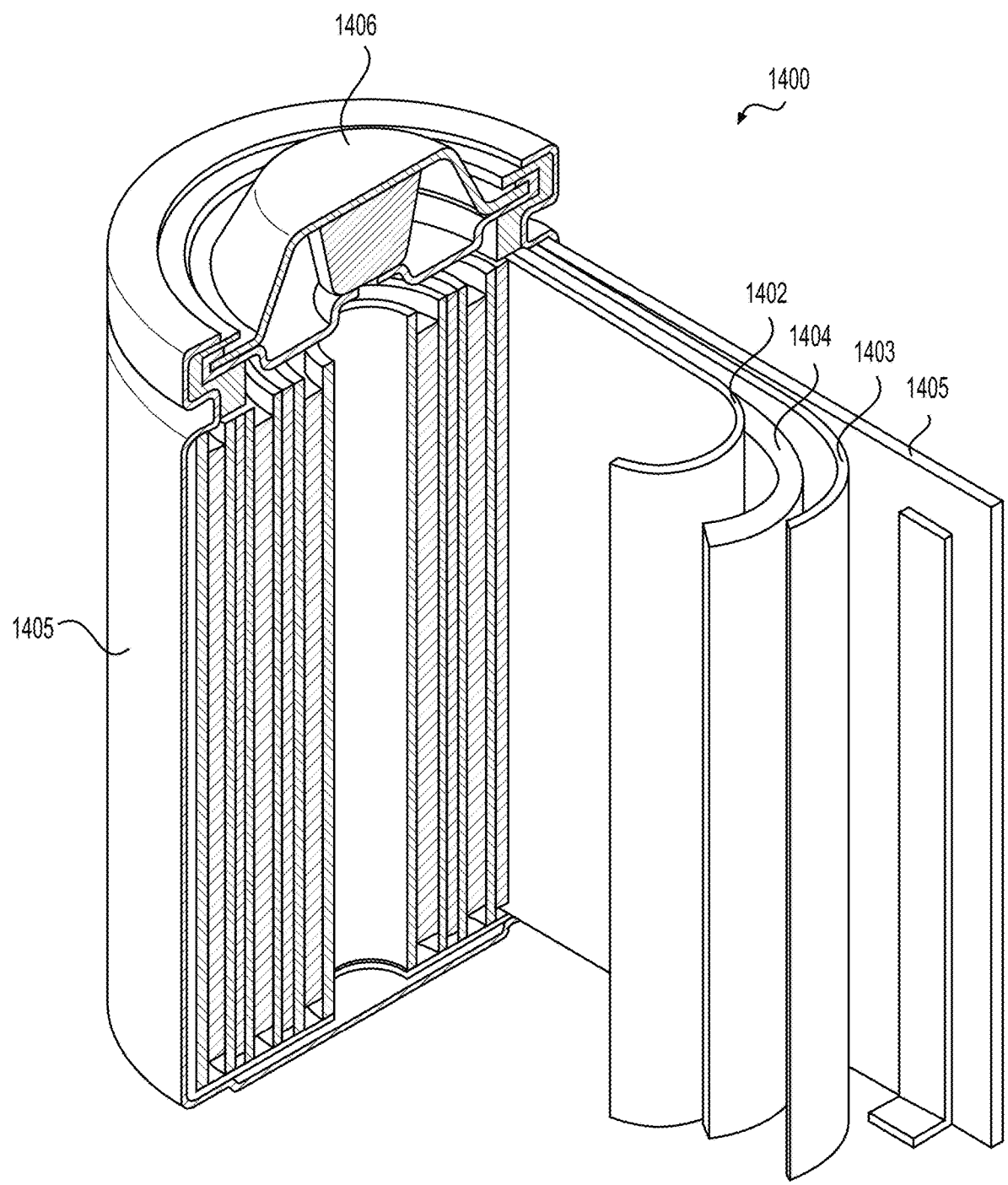
FIG. 14 illustrates an example metal-ion (e.g., Li-ion) battery in which the components, materials, methods, and other techniques described herein, or combinations thereof, may be applied according to various embodiments.

FIG. 14 illustrates an example metal-ion (e.g., Li-ion) battery 1400 in which the components, materials, methods, and other techniques described herein, or combinations thereof, may be applied according to various embodiments. A cylindrical battery is shown here for illustration purposes, but other types of arrangements, including prismatic or pouch (laminate-type) batteries, may also be used as desired. The example battery 1400 includes a negative anode 1402, a positive cathode 1403, a separator 1404 interposed between the anode 1402 and the cathode 1403, an electrolyte (not labeled separately) impregnating the separator 1404, a battery case 1405, and a sealing member 1406 sealing the battery case 1405.

The description is provided to enable any person skilled in the art to make or use embodiments of the present disclosure. It will be appreciated, however, that the present disclosure is not limited to the particular formulations, process steps, and materials disclosed herein, as various modifications to these embodiments will be readily apparent to those skilled in the art. That is, the generic principles defined herein may be applied to other embodiments without departing from the spirit or scope of the disclosure.

The invention claimed is:

1. A solid-state Li-ion battery (SSLB) cell, comprising:
   an anode electrode comprising an anode electrode surface and an anode active material;
   a cathode electrode comprising a cathode electrode surface and a cathode active material; and
   an inorganic, melt-infiltrated, solid state electrolyte (SSE) ionically coupling the anode electrode and the cathode electrode,
   wherein at least a portion of at least one of the electrode surfaces comprises an interphase layer separating the respective electrode active material from direct contact with the SSE, and
   wherein the interphase layer comprises two or more metals from the list of: Zr, Al, K, Cs, Fr, Be, Mg, Ca, Sr, Ba, Sc, Y, La or non-La lanthanoids, Ta, Hf, and Nb.

2. The SSLB cell of claim 1, wherein the at least one electrode surface comprises the anode electrode surface, the cathode electrode surface, or both.

3. The SSLB cell of claim 1, where the interphase layer comprises a zirconium oxide or oxyfluoride, an aluminum oxide or oxyfluoride, or a combination thereof.

4. The SSLB cell of claim 1, where the interphase layer is deposited by atomic layer deposition (ALD).

5. The SSLB cell of claim 1, wherein at least one of the electrodes comprises one, two or more polymer binders selected from the group of: polyvinylidene fluoride (PVDF), polyamideimide (PAI), polyether(ether)imide (PEI), polyether ether ketone (PEEK), aramid polymer, co-polyimide, poly(imide-co-amide), poly(imide-co-siloxane), polyester imide, polybenzimidazoles, polybenzothiazole, polybenzoxazoles, polybisthiazoles, polyhydrazides, polyquinaxolines, or other polyheterocycles polymers.

6. The SSLB cell of claim 1, wherein the cathode electrode exhibits areal capacity loading in excess of about 3 mAh/cm$^2$.

7. The SSLB cell of claim 1, wherein the cathode active material comprises nickel (Ni).

8. The SSLB cell of claim 7, wherein an atomic fraction of Ni in a composition of the cathode active material is more than about 80 at. %, relative to all transition metals in the cathode active material.

9. The SSLB cell of claim 1, wherein the anode electrode comprises conductive sp2-bonded carbon.

10. The SSLB cell of claim 1, wherein the anode electrode comprises porous anode particles, where at least a portion of a pore volume of the porous anode particles is configured to accommodate volume expansion of Li during SSLB charging.

11. The SSLB cell of claim 10, wherein the porous anode particles comprise Si.

12. The SSLB cell of claim 1, wherein the SSE exhibits a melting point below about 350° C.

13. The SSLB cell of claim 12, wherein the SSE exhibits a melting point below 250° C.

14. The SSLB cell of claim 1, where the SSE comprises more than about 5 at. % Cl.

15. The SSLB cell of claim 1, where the SSE comprise more than about 10 at. % Li.

16. The SSLB cell of claim 1, where the SSE comprises more than about 10 at. % H.

17. The SSLB cell of claim 1, wherein the melt-infiltration of the SSE between the anode electrode and the cathode electrode is performed at a reduced pressure in a vacuum.

18. The SSLB cell of claim 17, wherein the reduced pressure is lower than about 0.01 atm.

19. The SSLB cell of claim 1, wherein a first charge the SSLB at a temperature that is above about ⅔ of a melting point of the SSE, in kelvin (K).

20. The SSLB cell of claim 19, wherein the temperature is above the melting point of the SSE.

* * * * *